United States Patent
Xiao et al.

(10) Patent No.: US 11,528,090 B2
(45) Date of Patent: Dec. 13, 2022

(54) PARAMETER DETERMINING METHOD, MONITORING METHOD, AND COMMUNICATIONS APPARATUS

(71) Applicant: Huawei Technologies Co., Ltd., Shenzhen (CN)

(72) Inventors: Jiehua Xiao, Shenzhen (CN); Jinlin Peng, Shanghai (CN); Ting Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/094,573

(22) Filed: Nov. 10, 2020

(65) Prior Publication Data
US 2021/0058189 A1    Feb. 25, 2021

Related U.S. Application Data

(63) Continuation of application No. PCT/CN2019/085794, filed on May 7, 2019.

(30) Foreign Application Priority Data

May 11, 2018    (CN) .......................... 201810450877.9

(51) Int. Cl.
*H04L 1/00*    (2006.01)
*H04L 5/00*    (2006.01)

(52) U.S. Cl.
CPC ............ *H04L 1/0038* (2013.01); *H04L 5/001* (2013.01); *H04L 5/0042* (2013.01)

(58) Field of Classification Search
CPC ..... H04L 1/0038; H04L 5/001; H04L 5/0042; H04L 5/0053; H04L 5/0082; H04L 5/0044
See application file for complete search history.

(56) References Cited

U.S. PATENT DOCUMENTS 10,826,758 B2 * 11/2020 Huang ................ H04L 25/0202
2014/0119305 A1 * 5/2014 Li ......................... H04W 52/40
370/329

(Continued)

FOREIGN PATENT DOCUMENTS

CN    101047488 A    10/2007
CN    104396176 A    3/2015

(Continued)

OTHER PUBLICATIONS

QUALCOMM Incorporated, "Remaining issues on control resource set and search space", 3GPP TSG RAN WG1 Meeting #92bis R1-1804798, Apr. 16-Apr. 20, 2018, 14 pages, Sanya, China.

(Continued)

*Primary Examiner* — Ayaz R Sheikh
*Assistant Examiner* — Tarell A Hampton
(74) *Attorney, Agent, or Firm* — Slater Matsil, LLP

(57) ABSTRACT

This application provides a parameter determining method, a monitoring method, and a communications apparatus. The method includes: configuring, by a network device, a plurality of serving cells for a terminal, where at least two of the plurality of serving cells have different subcarrier spacings; and determining, by the network device based on at least one of subcarrier spacings of the plurality of serving cells, a maximum number of physical downlink control channel PDCCH candidates monitored by the terminal in a unit time. According to this application, a maximum number of PDCCH candidates monitored by a terminal in one time unit can be determined when carriers for carrier aggregation correspond to different subcarrier spacings.

16 Claims, 10 Drawing Sheets

Method 100

A network device configures a plurality of serving cells for a terminal, where at least two of the plurality of serving cells have different subcarrier spacings — 110

The network device determines, based on at least one of subcarrier spacings of the plurality of serving cells, a maximum number of physical downlink control channel PDCCH candidates monitored by the terminal in a unit time — 120

(56) References Cited

U.S. PATENT DOCUMENTS

| | | | | |
|---|---|---|---|---|
| 2014/0307694 A1* | 10/2014 | Zeng | ............... | H04W 72/042 370/329 |
| 2019/0223164 A1* | 7/2019 | He | ............... | H04W 76/27 |
| 2019/0306700 A1* | 10/2019 | Lin | ............... | H04W 76/11 |
| 2019/0349155 A1* | 11/2019 | Xu | ............... | H04L 5/001 |
| 2020/0092073 A1* | 3/2020 | Papasakellariou | .... | H04L 5/0092 |
| 2020/0220691 A1* | 7/2020 | Gao | ............... | H04L 5/001 |
| 2021/0084620 A1* | 3/2021 | Tooher | ............... | H04W 72/042 |
| 2021/0168844 A1* | 6/2021 | Takeda | ............... | H04L 27/00 |

FOREIGN PATENT DOCUMENTS

| | | |
|---|---|---|
| CN | 107113603 A | 8/2017 |
| CN | 107409016 A | 11/2017 |
| CN | 107547179 A | 1/2018 |
| CN | 107888349 A | 4/2018 |
| EP | 3247060 A1 | 11/2017 |
| WO | 2017078165 A1 | 5/2017 |
| WO | 2019099435 A1 | 5/2019 |

OTHER PUBLICATIONS

Ericsson, "On HARQ Management", 3GPP TSG RAN1 WG1 Meeting #91 R1-1721013, Nov. 27-Dec. 1, 2017, 11 pages, Reno, USA.

3GPP TS 36.212 V15.1.0 (Mar. 2018), 3rd Generation Partnership Project, Technical Specification Group Radio Access Network, Evolved Universal Terrestrial Radio Access (E-UTRA), Multiplexing and channel coding (Release 15), 234 pages.

3GPP TS 38.213 V15.1.0 (Mar. 2018), 3rd Generation Partnership Project, Technical Specification Group Radio Access Network, NR, Physical layer procedures for control (Release 15), 77 pages.

Oppo, Remaining issues on Search Space. 3GPP TSG RAN WG1 Meeting #92bis, Sanya, China, Apr. 16-20, 2018, R1-1803988, 5 pages.

Nokia, Nokia Shanghai Bell, "Remaining details on search space", 3GPP TSG RAN WG1 #92bis R1-1805517, Apr. 16-20, 2018, 14 pages, Sanya, China.

* cited by examiner

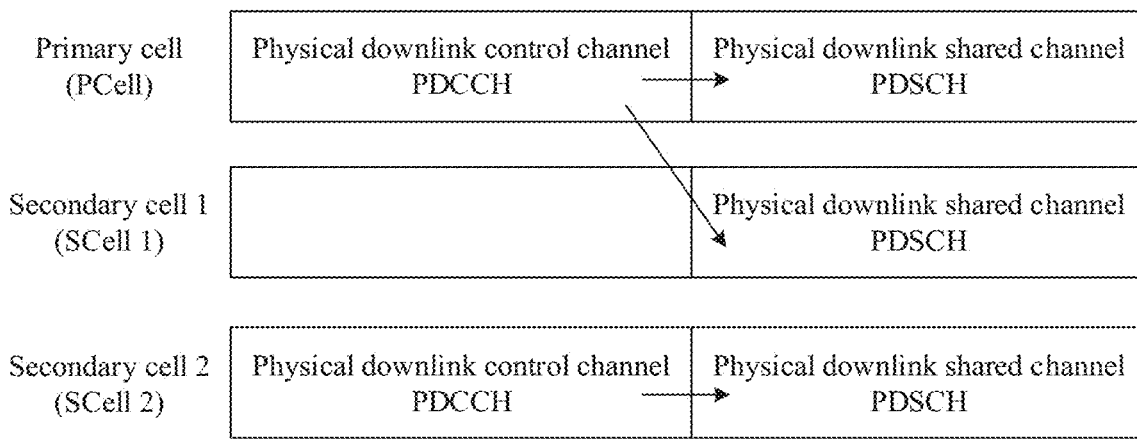

FIG. 4

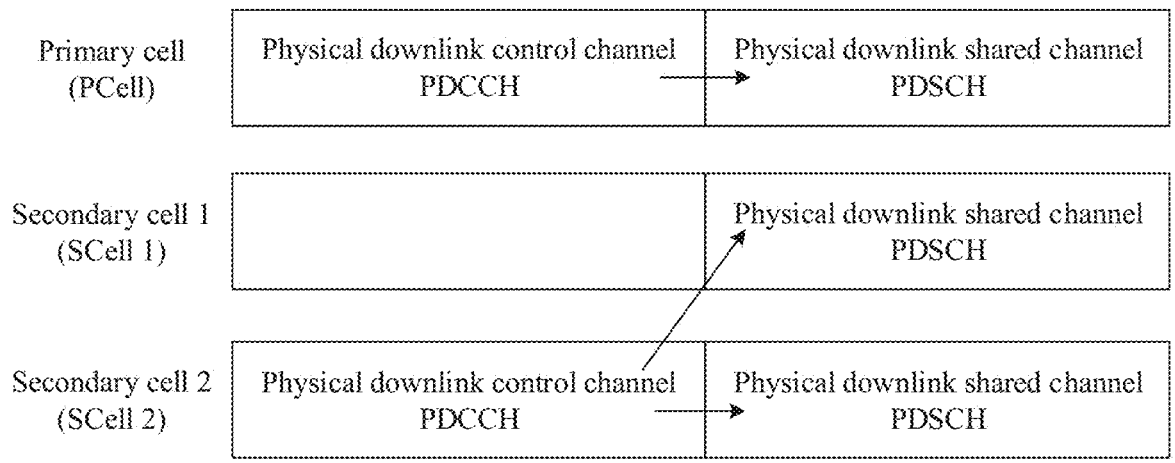

FIG. 5

Method 100

A network device configures a plurality of serving cells for a terminal, where at least two of the plurality of serving cells have different subcarrier spacings — 110

The network device determines, based on at least one of subcarrier spacings of the plurality of serving cells, a maximum number of physical downlink control channel PDCCH candidates monitored by the terminal in a unit time — 120

FIG. 6

Carrier #1
SCS=15 kHz
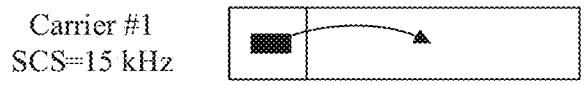
Carrier #2
SCS=30 kHz
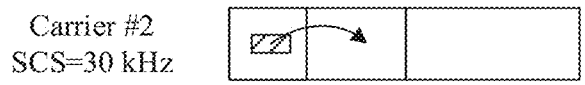
Carrier #3
SCS=30 kHz
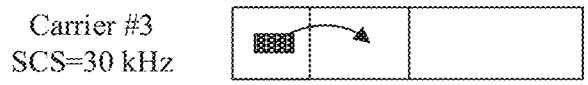
Carrier #4
SCS=15 kHz
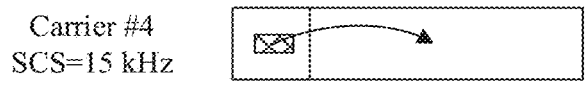
Carrier #5
SCS=30 kHz
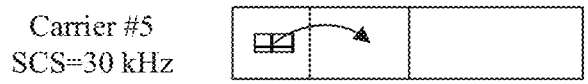
FIG. 11
Carrier #1
SCS=15 kHz
Carrier #2
SCS=30 kHz
Carrier #3
SCS=30 kHz
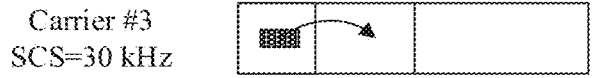
Carrier #4
SCS=15 kHz
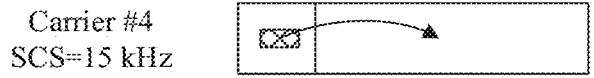
Carrier #5
SCS=30 kHz
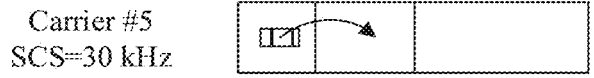
FIG. 12

PARAMETER DETERMINING METHOD, MONITORING METHOD, AND COMMUNICATIONS APPARATUS

CROSS-REFERENCE TO RELATED APPLICATIONS

This application is a continuation of International Application No. PCT/CN2019/085794, filed on May 7, 2019, which claims priority to Chinese Patent Application No. 201810450877.9, filed on May 11, 2018. The disclosures of the aforementioned applications are hereby incorporated by reference in their entireties.

TECHNICAL FIELD

This application relates to the communications field, and more specifically, to a parameter determining method, a monitoring method, and a communications apparatus.

BACKGROUND

A network device usually sends downlink control information (DCI) to a terminal on a physical downlink control channel (PDCCH), to schedule data transmission between the network device and the terminal. The DCI has many formats. Before receiving the DCI that belongs to the terminal, the terminal is not sure of either a format of the received DCI or a PDCCH candidate used to transmit the DCI that the terminal expects to receive. Therefore, the terminal performs PDCCH blind detection.

In discussion of new radio (NR) Rel-15, due to a limited PDCCH blind detection capability of a terminal, a maximum number of PDCCH candidates in one time unit in a serving cell needs to be defined, to indicate a network device to configure a search space, thereby ensuring that a related configuration does not exceed an upper limit of the blind detection capability of the terminal.

Currently, in a carrier aggregation scenario, a maximum number of PDCCH candidates in one time unit is determined as a product of a number of PDCCH candidates that corresponds to one carrier and a number of aggregated carriers. In the foregoing scenario, carriers are considered to have same configuration parameters.

SUMMARY

This application provides a parameter determining method, a monitoring method, and a communications apparatus, so that a maximum number of PDCCH candidates monitored by a terminal in one time unit can be determined when carriers for carrier aggregation correspond to different subcarrier spacings.

According to a first aspect, a parameter determining method is provided. The method includes: configuring, by a network device, a plurality of serving cells for a terminal, where at least two of the plurality of serving cells have different subcarrier spacings; and determining, by the network device based on at least one of subcarrier spacings of the plurality of serving cells, a maximum number of physical downlink control channel PDCCH candidates monitored by the terminal in a unit time.

Based on the foregoing technical solution, alternatively, when carrier aggregation is performed on carriers (for example, active bandwidth parts BWPs) in the plurality of serving cells, and a plurality of carriers include at least two different subcarrier spacings, maximum numbers of physical downlink control channel PDCCH candidates that can be monitored by the terminal in the plurality of serving cells in a unit time can be determined. The maximum numbers of physical downlink control channel PDCCH candidates that can be monitored in the plurality of serving cells may be different, or may be the same. For example, a maximum value is selected as a number of physical downlink control channel PDCCH candidates that can be monitored by the terminal. In this way, communication flexibility and efficiency can also be improved.

With reference to the first aspect, in some implementations of the first aspect, the unit time includes first duration or predefined duration, and the first duration is a slot length corresponding to a subcarrier spacing of any one of the plurality of serving cells.

Based on the foregoing technical solution, the unit time may be duration corresponding to any carrier for the carrier aggregation, or may be predefined duration.

With reference to the first aspect, in some implementations of the first aspect, the determining, by the network device based on at least one of subcarrier spacings of the plurality of serving cells, a maximum number of physical downlink control channel PDCCH candidates monitored by the terminal in a unit time includes: determining, by the network device based on a number of the plurality of serving cells and a number of PDCCH candidates that corresponds to a subcarrier spacing of a first serving cell in the unit time, the maximum number of PDCCH candidates monitored by the terminal in the unit time, where the first serving cell is any one of the plurality of serving cells; or determining, by the network device based on a number of PDCCH candidates that corresponds to a subcarrier spacing of a second serving cell in the unit time and a number of PDCCH candidates that corresponds to a subcarrier spacing of a third serving cell in the unit time, the maximum number of PDCCH candidates monitored by the terminal in the unit time, where the second serving cell and the third serving cell are any two of the plurality of serving cells, and the subcarrier spacing of the second serving cell is different from the subcarrier spacing of the third serving cell; or determining, by the network device based on a number of PDCCH candidates that corresponds to a subcarrier spacing of each of the serving cells in the unit time, a maximum number of PDCCH candidates monitored by the terminal in the unit time that corresponds to each serving cell.

Based on the foregoing technical solution, the network device may determine the maximum number of PDCCH candidates based on any one of the plurality of serving cells and a number of aggregated carriers. Alternatively, the network device may further determine the maximum number of PDCCH candidates by comprehensively considering a number of PDCCH candidates that corresponds to each carrier for the carrier aggregation in the unit time. Alternatively, the network device may further determine a maximum number of PDCCH candidates that corresponds to the plurality of serving cells, based on a reference serving cell (for example, when the unit time is predefined duration).

With reference to the first aspect, in some implementations of the first aspect, when the network device determines, based on the number of the plurality of serving cells and the number of PDCCH candidates that corresponds to the subcarrier spacing of the first serving cell in the unit time, the maximum number of PDCCH candidates monitored by the terminal in the unit time, the maximum number, determined by the network device, of PDCCH candidates monitored by the terminal in the unit time is a product of the number of the plurality of serving cells and the number of PDCCH candidates that corresponds to the subcarrier spacing of the first serving cell in the unit time; or when the network device determines, based on the number of PDCCH candidates that corresponds to the subcarrier spacing of the second serving cell in the unit time and the number of PDCCH candidates that corresponds to the subcarrier spacing of the third serving cell in the unit time, the maximum number of PDCCH candidates monitored by the terminal in the unit time, the maximum number, determined by the network device, of PDCCH candidates monitored by the terminal in the unit time is a sum of the number of PDCCH candidates that corresponds to the subcarrier spacing of the second serving cell in the unit time and the number of PDCCH candidates that corresponds to the subcarrier spacing of the third serving cell in the unit time; or when the network device determines, based on the number of PDCCH candidates that corresponds to the subcarrier spacing of each of the serving cells in the unit time, the maximum number of PDCCH candidates monitored by the terminal in the unit time that corresponds to each serving cell, the maximum number, determined by the network device, of PDCCH candidates monitored by the terminal in the unit time that corresponds to each serving cell is a sum of the number of PDCCH candidates that corresponds to the subcarrier spacing of each of the plurality of the serving cells in the unit time.

Based on the foregoing technical solution, the network device may determine that the maximum number of PDCCH candidates is a product of a maximum number of PDCCH candidates that corresponds to any one of the plurality of serving cells and the number of aggregated carriers. Alternatively, the network device may determine that the maximum number of PDCCH candidates is a sum of a number of PDCCH candidates that corresponds to each carrier for the carrier aggregation in the unit time. According to this embodiment of this application, the maximum number of PDCCH candidates can be determined simply and quickly.

With reference to the first aspect, in some implementations of the first aspect, the unit time is the first duration, and the first duration is a slot length corresponding to the subcarrier spacing of the second serving cell; and when the maximum number, determined by the network device, of PDCCH candidates monitored by the terminal in the unit time is the sum of the number of PDCCH candidates that corresponds to the subcarrier spacing of the second serving cell in the unit time and the number of PDCCH candidates that corresponds to the subcarrier spacing of the third serving cell in the unit time, the maximum number, determined by the network device, of PDCCH candidates monitored by the terminal in the unit time is a sum of a number of PDCCH candidates that corresponds to the subcarrier spacing of the second serving cell in the first duration and a number of PDCCH candidates that corresponds to the subcarrier spacing of the third serving cell in the first duration. The number of PDCCH candidates that corresponds to the subcarrier spacing of the third serving cell in the first duration is determined based on the first duration, second duration, and a number of PDCCH candidates that corresponds to the third serving cell in the second duration, and the second duration is a slot length corresponding to the subcarrier spacing of the third serving cell.

Based on the foregoing technical solution, when the unit time is duration corresponding to a subcarrier spacing of any one of the plurality of serving cells, each carrier for the carrier aggregation may be first processed. For example, a number of PDCCH candidates that corresponds to each carrier in the unit time is determined based on the unit time, duration corresponding to each carrier, and a number of PDCCH candidates in the duration corresponding to each carrier, to determine the maximum number of PDCCH candidates.

With reference to the first aspect, in some implementations of the first aspect, the unit time is the predefined duration, and that the maximum number, determined by the network device, of PDCCH candidates monitored by the terminal in the unit time is a sum of the number of PDCCH candidates that corresponds to the subcarrier spacing of each of the plurality of the serving cells in the unit time includes: the maximum number of physical downlink control channel PDCCH candidates monitored by the terminal in the unit time is a sum of a number of PDCCH candidates that corresponds to each of the plurality of the serving cells in duration corresponding to each serving cell; or the maximum number of physical downlink control channel PDCCH candidates monitored by the terminal in the unit time is a sum of a number of PDCCH candidates that corresponds to each of the plurality of the serving cells in the predefined duration, where the number of PDCCH candidates that corresponds to each of the plurality of the serving cells in the predefined duration is determined based on the duration corresponding to each of the plurality of serving cells, the predefined duration, and the number of PDCCH candidates that corresponds to each of the plurality of the serving cells in duration corresponding to each serving cell.

Based on the foregoing technical solution, after the unit time is determined, each carrier for the carrier aggregation may be first processed. For example, a number of PDCCH candidates that corresponds to each carrier in the unit time is determined based on duration corresponding to each carrier, and a number of PDCCH candidates in the duration corresponding to each carrier, to determine the maximum number of PDCCH candidates.

With reference to the first aspect, in some implementations of the first aspect, the method further includes: receiving, by the network device, first information reported by the terminal, where the first information is used to indicate a first parameter related to a maximum number of PDCCH candidates that can be supported by the terminal; and the determining, by the network device based on at least one of subcarrier spacings of the plurality of serving cells, a maximum number of physical downlink control channel PDCCH candidates monitored by the terminal in a unit time includes: determining, by the network device based on the first parameter and the at least one of the plurality of subcarrier spacings of the plurality of serving cells, the maximum number of PDCCH candidates monitored by the terminal in the unit time.

Based on the foregoing technical solution, the network device may also receive information sent by the terminal, for example, when the number of aggregated carriers is greater than 4. The information is used to indicate a parameter related to the maximum number of PDCCH candidates that can be supported by the terminal, so that the maximum number of PDCCH candidates monitored by the terminal in the plurality of serving cells in the unit time can be further determined.

With reference to the first aspect, in some implementations of the first aspect, the method further includes: receiving, by the network device, second information reported by the terminal, where the second information is used to indicate N parameters, the N parameters are parameters related to a maximum number of PDCCH candidates that can be supported by the terminal, and N is less than or equal to a number of the plurality of serving cells; and the determining, by the network device based on at least one of subcarrier spacings of the plurality of serving cells, a maximum number of physical downlink control channel PDCCH candidates monitored by the terminal in a unit time includes: determining, by the network device based on the N parameters and the at least one of the subcarrier spacings of the plurality of serving cells, the maximum number of PDCCH candidates monitored by the terminal in the unit time.

Based on the foregoing technical solution, the network device may also receive information sent by the terminal, for example, when the number of aggregated carriers is greater than 4. The information is used to indicate a plurality of parameters related to the maximum number of PDCCH candidates that can be supported by the terminal. For example, one parameter is reported for each of carriers whose subcarrier spacings are different from each other. In this way, the maximum number of PDCCH candidates monitored by the terminal in the plurality of serving cells in the unit time can be further determined.

With reference to the first aspect, in some implementations of the first aspect, the maximum number of PDCCH candidates includes a number of PDCCH candidates that corresponds to formats of downlink control information DCI in different sizes; and a total number of the formats of the DCI of the different sizes is less than or equal to M times a number that is of formats of DCI in different sizes and that corresponds to any one of the plurality of serving cells, where M is the number of the plurality of serving cells; and/or a number that is of formats of DCI in different sizes and that corresponds to a fourth serving cell is less than or equal to K times a number that is of formats of DCI in different sizes and that corresponds to one serving cell, where the fourth serving cell is a cell that performs cross-carrier scheduling and that is in the plurality of serving cells, and K is a number of serving cells for which the fourth serving cell performs the cross-carrier scheduling.

According to a second aspect, a monitoring method is provided. The monitoring method includes: obtaining, by a terminal, a maximum number physical downlink control channel PDCCH candidates monitored in a unit time; and monitoring, by the terminal, a PDCCH based on the maximum number of PDCCH candidates, where a plurality of serving cells are configured for the terminal, at least two of the plurality of serving cells have different subcarrier spacings, and the maximum number of PDCCH candidates is determined based on at least one of subcarrier spacings of the plurality of serving cells.

With reference to the second aspect, in some implementations of the second aspect, the unit time includes first duration or predefined duration, and the first duration is a slot length corresponding to a subcarrier spacing of a serving cell in the plurality of serving cells.

With reference to the second aspect, in some implementations of the second aspect, that the maximum number of PDCCH candidates is determined based on at least one of subcarrier spacings of the plurality of serving cells includes:

the maximum number of PDCCH candidates is determined based on a number of the plurality of serving cells and a number of PDCCH candidates that corresponds to a subcarrier spacing of a first serving cell in the unit time, where the first serving cell belongs to the plurality of serving cells; or the maximum number of PDCCH candidates is determined based on a number of PDCCH candidates that corresponds to a subcarrier spacing of a second serving cell in the unit time and a number of PDCCH candidates that corresponds to a subcarrier spacing of a third serving cell in the unit time, where the second serving cell and the third serving cell belong to the plurality of serving cells, and the subcarrier spacing of the second serving cell is different from the subcarrier spacing of the third serving cell; or the maximum number of PDCCH candidates is determined based on a number of PDCCH candidates that corresponds to a subcarrier spacing of each of the serving cells in the unit time.

With reference to the second aspect, in some implementations of the second aspect, when the maximum number of PDCCH candidates is determined based on the number of the plurality of serving cells and the number of PDCCH candidates that corresponds to the subcarrier spacing of the first serving cell in the unit time, the maximum number of PDCCH candidates monitored by the terminal in the unit time is a product of the number of the plurality of serving cells and the number of PDCCH candidates that corresponds to the subcarrier spacing of the first serving cell in the unit time; or when the maximum number of PDCCH candidates is determined based on the number of PDCCH candidates that corresponds to the subcarrier spacing of the second serving cell in the unit time and the number of PDCCH candidates that corresponds to the subcarrier spacing of the third serving cell in the unit time, the maximum number of PDCCH candidates monitored by the terminal in the unit time is a sum of the number of PDCCH candidates that corresponds to the subcarrier spacing of the second serving cell in the unit time and the number of PDCCH candidates that corresponds to the subcarrier spacing of the third serving cell in the unit time; or when the maximum number of PDCCH candidates is determined based on the number of PDCCH candidates that corresponds to the subcarrier spacing of each of the serving cells in the unit time, the maximum number of PDCCH candidates monitored by the terminal in the unit time is a sum of the number of PDCCH candidates that corresponds to the subcarrier spacing of each of the plurality of the serving cells in the unit time.

With reference to the second aspect, in some implementations of the second aspect, the monitoring method further includes: reporting, by the terminal, first information to a base station, where the first information is used to indicate a first parameter related to a maximum number of PDCCH candidates that can be supported by the terminal; and the maximum number of physical downlink control channel PDCCH candidates monitored by the terminal in the unit time is further determined based on the first parameter.

With reference to the second aspect, in some implementations of the second aspect, the method further includes: reporting, by the terminal, second information to a base station, where the second information is used to indicate N parameters, the N parameters are parameters related to a maximum number of PDCCH candidates that can be supported by the terminal, and respectively correspond to different subcarrier spacings of the plurality of serving cells, N is a positive integer, and N is less than or equal to a number of the plurality of serving cells; and the maximum number of physical downlink control channel PDCCH candidates monitored by the terminal in the unit time is further determined based on the N parameters.

With reference to the second aspect, in some implementations of the second aspect, the maximum number of PDCCH candidates includes a number of PDCCH candidates that corresponds to formats of downlink control information DCI in different sizes; and a total number of the formats of the DCI of the different sizes is less than or equal to M times a number that is of formats of DCI in different sizes and that corresponds to any one of the plurality of serving cells, where M is the number of the plurality of serving cells; and/or a number that is of formats of DCI in different sizes and that corresponds to a fourth serving cell is less than or equal to K times a number that is of formats of DCI in different sizes and that corresponds to one serving cell, where the fourth serving cell is a cell that performs cross-carrier scheduling and that is in the plurality of serving cells, and K is a number of serving cells for which the fourth serving cell performs the cross-carrier scheduling.

According to a third aspect, a parameter determining method is provided. The method includes: determining, by a network device, a counter downlink assignment indicator C-DAI and/or a total downlink assignment indicator T-DAI based on a serving cell of a terminal, a physical downlink control channel PDCCH monitoring occasion, and a parameter associated with the PDCCH monitoring occasion; and sending, by the network device, downlink control information DCI that includes the C-DAI and/or the T-DAI to the terminal.

Based on the foregoing technology, when one PDCCH monitoring occasion includes a plurality of pieces of DCI, counting of the C-DAI and/or the T-DAI may be performed based on the PDCCH monitoring occasion and the parameter associated with the PDCCH monitoring occasion, so that each piece of feedback information (for example, a HARQ-ACK) can be fed back, thereby avoiding missing codebook information.

With reference to the third aspect, in some implementations of the third aspect, the parameter associated with the PDCCH monitoring occasion includes one or more of the following:

a start control channel element CCE index corresponding to a PDCCH in the PDCCH monitoring occasion;

position information of data scheduled by using the PDCCH in the PDCCH monitoring occasion; and a sequence number (ID value) of a control resource set CORESET associated with a search space associated with the PDCCH in the PDCCH monitoring occasion.

With reference to the third aspect, in some implementations of the third aspect, the position information of the data scheduled by using the PDCCH includes an index of a position of the data scheduled by using the PDCCH, and an order of the position of the data scheduled by using the PDCCH is first in order of frequency domain position and then in order of time domain position.

According to a fourth aspect, a parameter determining method is provided. The method includes: receiving, by a terminal, downlink control information DCI that is sent by a network device and that includes a counter downlink assignment indicator C-DAI and/or a total downlink assignment indicator T-DAI, where the C-DAI and/or the T-DAI are/is determined based on a serving cell of the terminal, a physical downlink control channel PDCCH monitoring occasion, and a parameter associated with the PDCCH monitoring occasion; and generating, by the terminal, feedback information based on the C-DAI and/or the T-DAI.

Based on the foregoing technology, when one PDCCH monitoring occasion includes a plurality of pieces of DCI, comprehensive counting may be performed based on the PDCCH monitoring occasion and the parameter associated with the PDCCH monitoring occasion, so that each piece of feedback information (for example, a HARQ-ACK) can be fed back, thereby avoiding missing codebook information.

With reference to the fourth aspect, in some implementations of the fourth aspect, the parameter associated with the PDCCH monitoring occasion includes one or more of the following:

a start control channel element CCE index corresponding to a PDCCH in the PDCCH monitoring occasion;

position information of data scheduled by using the PDCCH in the PDCCH monitoring occasion; and a sequence number (ID value) of a control resource set CORESET associated with a search space associated with the PDCCH in the PDCCH monitoring occasion.

With reference to the fourth aspect, in some implementations of the fourth aspect, the position information of the data scheduled by using the PDCCH includes an index of a position of the data scheduled by using the PDCCH, and an order of the position of the data scheduled by using the PDCCH is first in order of frequency domain position and then in order of time domain position.

According to a fifth aspect, a parameter determining method is provided. The method includes: determining, by a network device, a start time of a search space associated with a physical downlink control channel PDCCH monitoring occasion and information related to the PDCCH monitoring occasion; and sorting, by the network device, the PDCCH monitoring occasion based on the start time of the search space associated with the PDCCH monitoring occasion and the information related to the PDCCH monitoring occasion.

Based on the foregoing technical solution, a plurality of PDCCH monitoring occasions are sorted based on start times of search spaces associated with the PDCCH monitoring occasions and information related to the PDCCH monitoring occasions. This can avoid a problem that it is difficult to distinguish between a plurality of PDCCH monitoring occasions when the PDCCH monitoring occasions have a same start time.

With reference to the fifth aspect, in some implementations of the fifth aspect, the information related to the PDCCH monitoring occasion includes one or more of the following:

duration corresponding to the PDCCH monitoring occasion;

an end time of the search space associated with the PDCCH monitoring occasion;

an index value of the search space associated with the PDCCH monitoring occasion; and an index value of a control resource set CORSET associated with the search space associated with the PDCCH monitoring occasion.

With reference to the fifth aspect, in some implementations of the fifth aspect, when the information related to the PDCCH monitoring occasion is duration corresponding to the PDCCH monitoring occasion, the sorting, by the network device, the PDCCH monitoring occasion based on the start time of the search space associated with the PDCCH monitoring occasion and the information related to the PDCCH monitoring occasion includes:

numbering, by the network device, the PDCCH monitoring occasion according to the following formula:

$T = A*(L-1) + S$ where T represents a sequence number of the PDCCH monitoring occasion;

A represents a number of symbols included in each slot;

L represents the duration corresponding to the PDCCH monitoring occasion; and

S represents the start time of the search space associated with the PDCCH monitoring occasion.

According to a sixth aspect, a parameter determining method is provided. The method includes: determining, by a terminal, a start time of a search space associated with a physical downlink control channel PDCCH monitoring occasion and information related to the PDCCH monitoring occasion; and sorting, by the terminal, the PDCCH monitoring occasion based on the start time of the search space associated with the PDCCH monitoring occasion and the information related to the PDCCH monitoring occasion.

Based on the foregoing technical solution, a plurality of PDCCH monitoring occasions are sorted based on start times of search spaces associated with the PDCCH monitoring occasions and information related to the PDCCH monitoring occasions. This can avoid a problem that it is difficult to distinguish between a plurality of PDCCH monitoring occasions when the PDCCH monitoring occasions have a same start time.

With reference to the sixth aspect, in some implementations of the sixth aspect, the information related to the PDCCH monitoring occasion includes one or more of the following:

duration corresponding to the PDCCH monitoring occasion;

an end time of the search space associated with the PDCCH monitoring occasion;

an index value of the search space associated with the PDCCH monitoring occasion; and an index value of a control resource set CORSET associated with the search space associated with the PDCCH monitoring occasion.

With reference to the sixth aspect, in some implementations of the sixth aspect, when the information related to the PDCCH monitoring occasion is duration corresponding to the PDCCH monitoring occasion, the sorting, by the network device, the PDCCH monitoring occasion based on the start time of the search space associated with the PDCCH monitoring occasion and the information related to the PDCCH monitoring occasion includes:

numbering, by the network device, the PDCCH monitoring occasion according to the following formula:

$$T=A*(L-1)+S$$

where T represents a sequence number of the PDCCH monitoring occasion;

A represents a number of symbols included in each slot;

L represents the duration corresponding to the PDCCH monitoring occasion; and

S represents the start time of the search space associated with the PDCCH monitoring occasion.

According to a seventh aspect, a network device is provided. The network device has functions of implementing the network device in the method design in the first aspect, the third aspect, or the fifth aspect. The functions may be implemented by hardware, or may be implemented by hardware executing corresponding software. The hardware or the software includes one or more units corresponding to the foregoing functions.

According to an eighth aspect, a terminal device is provided. The terminal device has functions of implementing the terminal device in the method design in the second aspect, the fourth aspect, or the sixth aspect. The functions may be implemented by hardware, or may be implemented by hardware executing corresponding software. The hardware or the software includes one or more units corresponding to the foregoing functions.

According to a ninth aspect, a network device is provided. The network device includes a transceiver, a processor, and a memory. The processor is configured to control the transceiver to send and receive a signal. The memory is configured to store a computer program. The processor is configured to invoke the computer program from the memory and run the computer program, so that the network device performs the method according to any one of the first aspect, the third aspect, the fifth aspect, or the possible implementations of the first aspect, the third aspect, or the fifth aspect.

According to a tenth aspect, a terminal device is provided. The terminal device includes a transceiver, a processor, and a memory. The processor is configured to control the transceiver to send and receive a signal. The memory is configured to store a computer program. The processor is configured to invoke the computer program from the memory and run the computer program, so that the terminal device performs the method according to any one of the second aspect, the fourth aspect, the sixth aspect, or the possible implementations of the second aspect, the fourth aspect, or the sixth aspect.

According to an eleventh aspect, a communications apparatus is provided. The communications apparatus may be the network device in the foregoing method designs, or may be a chip disposed in the network device. The communications apparatus includes a processor. The processor is coupled to a memory, and may be configured to execute an instruction in the memory, to implement the method performed by the network device in any one of the first aspect, the third aspect, the fifth aspect, or the possible implementations of the first aspect, the third aspect, or the fifth aspect. Optionally, the communications apparatus further includes the memory. Optionally, the communications apparatus further includes a communications interface, and the processor is coupled to the communications interface.

According to a twelfth aspect, a communications apparatus is provided. The communications apparatus may be the terminal device in the foregoing method designs, or may be a chip disposed in the terminal device. The communications apparatus includes a processor. The processor is coupled to a memory, and may be configured to execute an instruction in the memory, to implement the method performed by the terminal device in any one of the second aspect, the fourth aspect, the sixth aspect, or the possible implementations of the second aspect, the fourth aspect, or the sixth aspect. Optionally, the communications apparatus further includes the memory. Optionally, the communications apparatus further includes a communications interface, and the processor is coupled to the communications interface.

According to a thirteenth aspect, a computer program product is provided. The computer program product includes computer program code, and when the computer program code is run on a computer, the computer is enabled to perform the methods in the foregoing aspects.

According to a fourteenth aspect, a computer-readable medium is provided. The computer-readable medium stores program code, and when the computer program code is run on a computer, the computer is enabled to perform the methods in the foregoing aspects.

According to a fifteenth aspect, a chip system is provided. The chip system includes a processor, configured to support a network device in implementing functions in the foregoing aspects, for example, generating, receiving, sending, or processing data and/or information used in the foregoing methods. In a possible design, the chip system further includes a memory. The memory is configured to store a program instruction and data that are necessary for the network device. The chip system may include a chip, or may include a chip and another discrete component.

According to a sixteenth aspect, a chip system is provided. The chip system includes a processor, configured to support a terminal device in implementing functions in the foregoing aspects, for example, generating, receiving, sending, or processing data and/or information used in the foregoing methods. In a possible design, the chip system further includes a memory. The memory is configured to store a program instruction and data that are necessary for the terminal device. The chip system may include a chip, or may include a chip and another discrete component.

BRIEF DESCRIPTION OF THE DRAWINGS

FIG. 4 is a schematic diagram of a scenario in which cross-carrier scheduling is configured according to an embodiment of this application;

FIG. 5 is another schematic diagram of a scenario in which cross-carrier scheduling is configured according to an embodiment of this application;

FIG. 6 is a schematic diagram of a parameter determining method according to an embodiment of this application;

FIG. 11 is another schematic diagram of a parameter determining method according to another embodiment of this application;

FIG. 12 is still another schematic diagram of a parameter determining method according to another embodiment of this application;

DETAILED DESCRIPTION OF ILLUSTRATIVE EMBODIMENTS

The following describes technical solutions of this application with reference to accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR) system.

Figure 1:
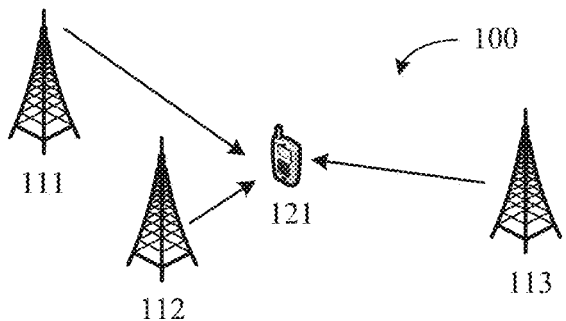
FIG. 1 is a schematic architecture diagram of a parameter determining system according to an embodiment of this application.

For ease of understanding the embodiments of this application, a communications system shown in FIG. 1 is first used as an example to describe in detail a communications system applicable to the embodiments of this application. FIG. 1 is a schematic diagram of a wireless communications system 100 according to an embodiment of this application. As shown in FIG. 1, the wireless communications system 100 may include one or more network devices, for example, a network device #1 111, a network device #2 112, and a network device #3 113 shown in FIG. 1. The wireless communications system 100 may further include one or more terminal devices, for example, a terminal device 121 shown in FIG. 1. The wireless communications system 100 may support CoMP transmission. To be specific, a plurality of cells or a plurality of network devices may cooperatively participate in transmitting data to one terminal device or jointly receive data sent by one terminal device, or a plurality of cells or a plurality of network devices perform coordinated scheduling or coordinated beamforming. The plurality of cells may belong to a same network device or different network devices, and may be selected based on a channel gain, a path loss, received signal strength, a received signal instruction, or the like.

It should be understood that the network device in the wireless communications system may be any device that has a wireless transceiver function or a chip that can be disposed in the device. The device includes but is not limited to an evolved NodeB (eNB), a radio network controller (RNC), a NodeB (NB), a base station controller (BSC), a base transceiver station (BTS), a home NodeB (for example, a home evolved NodeB, or a home Node B, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system; may be an antenna or a group (including a plurality of antenna panels) of antenna panels of a base station in a 5G system; or may be a network node, such as a baseband unit (BBU) or a distributed unit (DU), that constitutes a gNB or a transmission point.

In some deployments, the gNB may include a centralized unit (CU) and a DU. The gNB may further include a radio frequency unit (radio unit, RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further noted that the terminal device in the wireless communications system may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid (, a wireless terminal in transportation safety, a wireless terminal in a smart city, a wireless terminal in a smart home, or the like. An application scenario is not limited in the embodiments of this application. In this application, the terminal device and a chip that can be disposed in the terminal device are collectively referred to as a terminal device.

Optionally, in the communications system 100 shown in FIG. 1, one (for example, the network device #1) of the network device #1 to the network device #3 may be a serving network device. The serving network device may be a network device that provides at least one of an RRC connection, non-access stratum (NAS) mobility management, and security input for the terminal device by using a wireless air interface protocol. Optionally, the network device #2 and the network device #3 may be coordinated network devices. The serving network device may send control signaling to the terminal device, and the coordinated network device may send data to the terminal device; the serving network device may send control signaling to the terminal device, and the serving network device and the coordinated network device may send data to the terminal device; both the serving network device and the coordinated network device may send control signaling to the terminal device, and both the serving network device and the coordinated network device may send data to the terminal device; the coordinated network device may send control signaling to the terminal device, and at least one of the serving network device and the coordinated network device may send data to the terminal device; or the coordinated network device may send control signaling and data to the terminal device. This is not particularly limited in the embodiments of this application.

Optionally, in the communications system 100 shown in FIG. 1, the network device #1 to the network device #3 each may be a serving network device.

It should be understood that for ease of understanding, FIG. 1 shows, for example, only the network device #1 to the network device #3 and the terminal device. However, this should not constitute any limitation on this application. The wireless communications system may further include more or fewer network devices, and may include more terminal devices. Network devices communicating with different terminal devices may be a same network device, or may be different network devices. Numbers of network devices communicating with different terminal devices may be the same or may be different. These are not limited in this application.

For ease of understanding the embodiments of this application, before the embodiments of this application are described, several nouns or terms used in this application are first briefly described.

1. Physical Downlink Control Channel

The physical downlink control channel (PDCCH) may be used to send downlink scheduling information (DL Assignment) to a terminal, so that the terminal receives a physical downlink shared channel (PDSCH). The PDCCH may be further used to send uplink scheduling information (UL Grant) to the terminal, so that the terminal sends a physical uplink shared channel (PUSCH). The PDCCH may be further used to send an aperiodic channel quality indicator (CQI) report request. The PDCCH may be further used to notify a change of a multicast control channel (MCCH). The PDCCH may be further used to send an uplink power control command. The PDCCH may be further used for hybrid automatic repeat request (Hybrid Automatic Repeat reQuest, HARQ) related information. The PDCCH may be further used to carry a radio network temporary identifier (RNTI), where the information is implicitly included in a cyclic redundancy check (CRC), and the like.

A PDCCH is transmitted on a control channel element (CCE), and each CCE includes a specific number of resource element groups (Resource-element group, REG). A CCE index of the first CCE occupied by the PDCCH is $n_{CCE}$.

2. Downlink Control Information

Information carried on the PDCCH is referred to as downlink control information (DCI). The downlink DCI may be used to send downlink scheduling assignment information or uplink scheduling information. The DCI has a plurality of formats, and various DCI formats and specific information carried in the DCI formats vary with functions of the DCI formats. For example, format 0 in an LTE system or format 0_0/format 0_1 in an NR system may be used to transmit PUSCH scheduling grant information. For another example, format 1 in an LTE system or format 0_0/format 0_1 in an NR system may be used to transmit PDSCH single-codeword scheduling grant information.

The DCI may indicate cell-level information, and may be scrambled by using a system information radio network temporary identifier (SI-RNTI), a paging radio network temporary identifier (P-RNTI), a random access radio network temporary identifier (RA-RNTI), or the like. The DCI may also indicate terminal-level information, and may be scrambled by using a cell radio network temporary identifier (C-RNTI).

One PDCCH can carry only one piece of DCI of a specific format. In a cell, a plurality of terminals may be simultaneously scheduled in an uplink and a downlink. That is, in the cell, a plurality of pieces of scheduling information may be sent in each scheduling time unit. Each piece of scheduling information is transmitted on an independent PDCCH. That is, in a cell, a plurality of PDCCHs in one scheduling time unit may be simultaneously sent.

3. Aggregation Level

The PDCCH has different aggregation levels (AL), and the ALs include {1, 2, 4, 8, 16}. The aggregation level indicates a number of consecutive CCEs occupied by one PDCCH. A base station determines, based on factors such as channel quality, an aggregation level used for a PDCCH. For example, if a PDCCH is to be sent to a terminal with very good downlink channel quality (for example, the terminal is located in a cell center), one CCE may be sufficient to send the PDCCH. If a PDCCH is to be sent to a terminal with very poor downlink channel quality (for example, the terminal is located at a cell edge), eight CCEs or even 16 CCEs may be needed to send the PDCCH, to achieve sufficient robustness.

In addition, power of a PDCCH may also be adjusted according to a channel condition, and the base station may allocate extra PDCCH transmit power of a terminal with better channel quality to a terminal with poorer channel quality.

4. Carrier Aggregation

Figure 2:
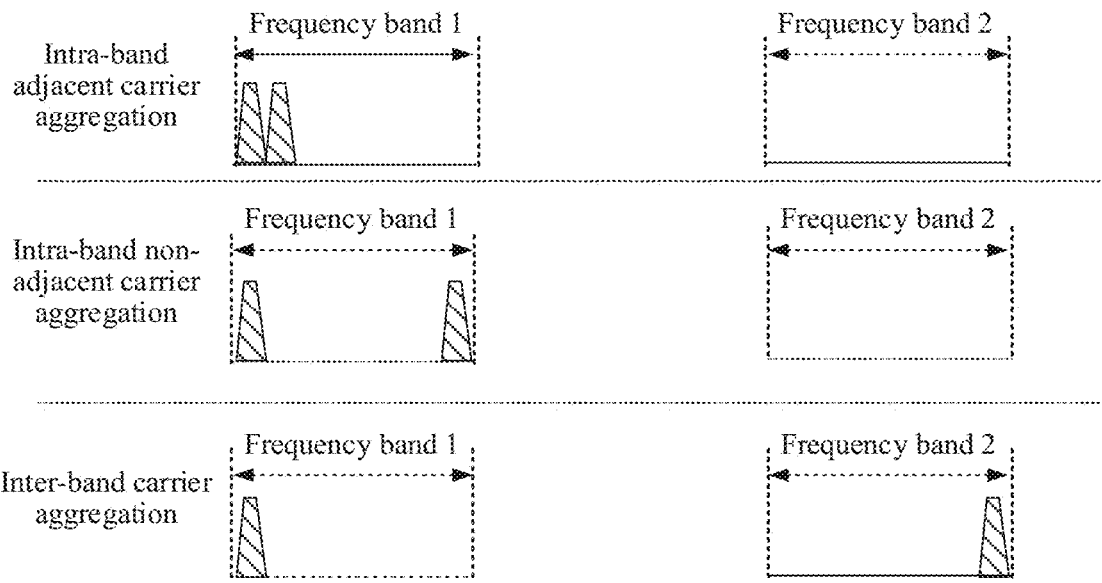
FIG. 2 is a schematic diagram of carrier aggregation according to an embodiment of this application.

Carrier aggregation (CA) means that two or more component carriers (CC) are aggregated together to support a larger transmission bandwidth. Actually, in existing LTE and NR systems, each component carrier usually corresponds to one independent cell. In this case, one component carrier may be equivalent to one cell. To efficiently utilize fragmented spectrums, carrier aggregation supports aggregation of different component carriers. As shown in FIG. 2, carrier aggregation may include aggregation of intra-band or inter-band component carriers, aggregation of intra-band adjacent or non-adjacent component carriers, and the like.

5. Cross-Carrier Scheduling

According to cross-carrier scheduling, PDCCHs on some component carriers are sent on other component carriers with better channel quality, so that PDCCH decoding efficiency can be improved.

Cross-carrier scheduling based on a carrier indicator field (CIF) allows a PDCCH of a serving cell to be used to schedule a radio resource on another serving cell. To be specific, control information is transmitted on one component carrier, and corresponding data is transmitted on another component carrier. The CIF may be used to specify a cell whose PDSCH/PUSCH resource corresponds to the PDCCH.

There are some restrictions on the cross-carrier scheduling. For example, the cross-carrier scheduling is not applicable to a primary cell (PCell), but may be applicable to a secondary cell (SCell).

The PCell may be a cell in which a terminal initially establishes a connection, or a cell in which a radio resource control (RRC) connection is reestablished, or a primary cell specified in a handover process. The PCell performs scheduling always through its own PDCCH.

The SCell is added during RRC reconfiguration to provide additional radio resources. When an SCell is configured with a PDCCH, cross-carrier scheduling does not apply to the SCell. When an SCell is not configured with a PDCCH, cross-carrier scheduling performed by the SCell is always performed by using a PDCCH of another serving cell.

Figure 3:
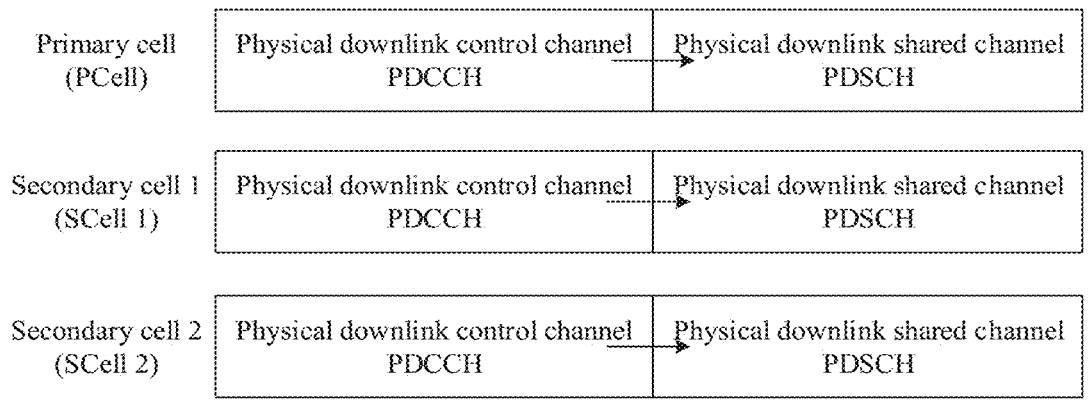
FIG. 3 is a schematic diagram of a scenario in which cross-carrier scheduling is not configured according to an embodiment of this application.

FIG. 3 is a schematic diagram of a scenario in which cross-carrier scheduling is not configured. As shown in FIG. 3, assuming that cross-carrier scheduling is not configured for a terminal, a PDCCH corresponding to each serving cell is sent on a carrier of the serving cell. In this case, the PDCCH sent by each cell carries no CIF field.

FIG. 4 is another schematic diagram of a scenario in which cross-carrier scheduling is configured. It is assumed that cross-carrier scheduling is configured for a terminal. A PCell schedules resources of both the PCell and an SCell 1.

The SCell 1 neither schedules its own resource nor schedules a resource of another cell. The resource of the SCell 1 is scheduled in the PCell.

An SCell 2 schedules its own resource but does not schedule a resource of another cell.

FIG. 5 is still another schematic diagram of a scenario in which cross-carrier scheduling is configured. It is assumed that cross-carrier scheduling is configured for a terminal. A PCell schedules its own resource but does not schedule a resource of another cell.

An SCell 1 neither schedules its own resource nor schedules a resource of another cell. The resource of the SCell 1 is scheduled in an SCell 2.

The SCell 2 schedules resources of both the SCell 2 and the SCell 1.

6. Search Space

The following separately describes search spaces in a non-carrier aggregation scenario and a carrier aggregation scenario.

Non-Carrier Aggregation Scenario

Non-carrier aggregation means that the terminal has only one serving cell. The terminal monitors a PDCCH candidate set in a PDCCH monitoring occasion. This means that the terminal needs to attempt to decode each PDCCH in the set based on a DCI format to be monitored. The set is referred to as a search space of the terminal.

The search space is classified into a common search space and a UE-specific search space. The common search space is used to transmit control information (cell-level common information) related to paging, a random access response (RA Response), a broadcast control channel (BCCH), and the like, and the information is the same for all terminals. The UE-specific search space is used to transmit control information (terminal-level information) related to a downlink shared channel (DL-SCH), an uplink shared channel (UL-SCH), and the like. When the UE-specific search space does not have sufficient available resources, the common search space may also be used to transmit control information belonging to a specific terminal.

The common search space may overlap the UE-specific search space, and UE-specific search spaces belonging to different terminals may also overlap. If an overlapped area is occupied by a terminal, another terminal cannot use these CCE resources.

During scheduling, a base station selects an available PDCCH candidate from a corresponding search space for each to-be-scheduled terminal. If a CCE can be allocated to a terminal, the base station performs scheduling. Otherwise, the base station does not perform scheduling. PDCCHs sent to different terminals may correspond to different aggregation levels.

Carrier Aggregation Scenario

If carrier aggregation is configured for a terminal, the terminal monitors all active search spaces of a serving cell on each PDCCH monitoring occasion. In this case, for a PDCCH candidate in a search space of each serving cell, when sending a PDCCH carrying a CIF, a base station knows a serving cell corresponding to the PDCCH, and also knows a PDCCH candidate set available to the PDCCH. However, the terminal is not sure of a CIF value carried on the PDCCH, that is, the terminal is not sure which serving cell sends the PDCCH to the terminal. The terminal knows only a set of CIFs that may be carried on a PDCCH sent by each specific serving cell to the terminal. Therefore, the UE attempts to use all possible CIF values in the serving cell to blindly detect the PDCCH.

7. PDCCH Blind Detection

DCI has a plurality of formats, but the terminal does not know in advance which format of DCI is carried on the to-be-received PDCCH, and does not know which PDCCH candidate is used to transmit the DCI either. Therefore, the terminal needs to perform PDCCH blind detection to receive corresponding DCI.

Although the terminal does not know in advance which format of DCI is carried on the to-be-received PDCCH, and does not know which PDCCH candidate is used to transmit the DCI either, the terminal knows a status of the terminal and DCI information expected to be received in the status.

For example, when the terminal is in an idle mode, the terminal expects to receive paging; after initiating random access, the terminal expects a random access response (RAR); when there is uplink data to be sent, the terminal expects an uplink grant, and so on.

In addition, the terminal knows its own search space, and therefore knows CCEs on which the DCI may be distributed. For different expected information, the terminal attempts to perform cyclic redundancy check (CRC) on a CCE in the search space of the terminal by using a corresponding RNTI, a possible DCI format, and a possible aggregation level. If the CRC check succeeds, the terminal knows that the information is required by the terminal, and also knows a corresponding DCI format, thereby decoding content of the DCI.

The terminal does not know which aggregation level is used for the to-be-received PDCCH. Therefore, the UE tries all possible aggregation levels. For example, for the common search space, the terminal needs to perform searching according to AL=4 and AL=8 separately. When AL=4 is used for blind detection, 16 CCEs need to be blindly detected four times, that is, there are four PDCCH candidates. When AL=8 is used for blind detection, 16 CCEs need to be blindly detected twice, that is, there are two PDCCH candidates. Therefore, for the common space, there are a total of 4+2=6 PDCCH candidates. For the UE-specific search space, the terminal needs to perform blind detection according to AL=1, 2, 4, and 8 separately. In this case, there are a total of 6+6+2+2=16 PDCCH candidates.

When performing blind detection in the search space, the terminal only needs to attempt to decode a DCI format that may appear, and does not need to perform matching on all DCI formats.

8. Time Unit

In the embodiments of this application, data or information may be carried on a time-frequency resource, and the time-frequency resource may include a time domain resource and a frequency domain resource. The time domain resource may include one or more time units (which may also be referred to as time domain units).

A time unit (which may also be referred to as a time domain unit) may be a symbol, a mini-slot, a slot, or a subframe. Duration of a subframe in time domain may be 1 millisecond (ms). One slot includes seven or 14 symbols, and one mini-slot may include at least one symbol (for example, two symbols, seven symbols, or 14 symbols, or any number of symbols fewer than or equal to 14 symbols).

9. Numerology

The numerology may refer to a set of parameters, including a subcarrier spacing (SCS), a symbol length, a slot length, a cyclic prefix (CP) length, and the like. In an NR system, a new feature is that a plurality of numerologies may be mixed and used at the same time. The numerology is defined by using the SCS and the CP. Table 1 shows a plurality of numerologies that currently can be supported in the NR system.

| μ | Δf = $2^\mu * 15$ (kHz) | CP |
|---|---|---|
| 0 | 15 | Normal |
| 1 | 30 | Normal |
| 2 | 60 | Normal, extended |
| 3 | 120 | Normal |
| 4 | 240 | Normal |

Specifically, it can be learned from Table 1 that μ may be used to represent different numerologies. It can be learned from Table 1 that at least four different numerologies, namely, μ=0, μ=1, μ=2, μ=3, and μ=4, are included. In the embodiments of this application, μ is denoted as μ0, μ1, μ2, μ3, and μ4 for differentiation. When μ=0, SCS=$2^\mu*15=2^0*15=15$ kHz. When μ=1, SCS=$2^\mu*15=2^1*15=30$ kHz. When μ=2, SCS=$2\mu*15=2^2*15=60$ kHz. When μ=3, SCS=$2\mu*15=2^3*15=120$ kHz. When μ=4, SCS=$2\mu*15=2^4*15=240$ kHz.

In case of different numerologies, maximum numbers of PDCCH candidates that can be supported by the terminal in each slot are different. Table 2 shows maximum numbers of PDCCH candidates that can be supported by the terminal in each slot in case of different numerologies in a non-carrier aggregation scenario (namely, a single serving cell scenario).

TABLE 2

| μ | Maximum number of PDCCH candidates supported by a terminal in each slot in each serving cell |
|---|---|
| 0 | 44 |
| 1 | 36 |
| 2 | 22 |
| 3 | 20 |

Specifically, as shown in Table 2, when μ=μ0=0, SCS=15 kHz, and a slot unit corresponding to SCS=15 kHz is a slot 1. In the slot 1, a maximum number of PDCCH candidates that can be supported by the terminal is 44. Likewise, when μ=μ1=1, SCS=30 kHz, and a slot unit corresponding to SCS=30 kHz is a slot 2. In the slot 2, a maximum number of PDCCH candidates that can be supported by the terminal is 36. Likewise, when μ=μ2=2, SCS=60 kHz, and a slot unit corresponding to SCS=60 kHz is a slot 3. In the slot 3, a maximum number of PDCCH candidates that can be supported by the terminal is 22. Likewise, when μ=μ3=3, SCS=120 kHz, and a slot unit corresponding to SCS=120 kHz is a slot 4. In the slot 4, a maximum number of PDCCH candidates that can be supported by the terminal is 20.

10. PDCCH Candidate

It should be understood that in the embodiments of this application, a PDCCH candidate is a set of all possible PDCCH positions, including various PDCCH candidates at different aggregation levels in all search spaces configured by a network device. Due to a limitation on a processing capability of a terminal, there is a maximum number of blindly detected PDCCHs that can be supported in a unit time, and the maximum number is equivalent to a maximum number of PDCCH candidates that can be supported by the terminal in this application.

It should be noted that in the embodiments of this application, the "maximum number of PDCCH candidates" and the "maximum number of PDCCH candidates that can be supported by the terminal" are usually used alternately, but a person skilled in the art can understand meanings thereof. For the terminal device, the "maximum number of PDCCH candidates" is essentially the maximum number of PDCCH candidates that can be supported by the terminal. Therefore, in the embodiments of this application, meanings expressed by the "maximum number of PDCCH candidates" and the "maximum number of PDCCH candidates that can be supported by the terminal" are consistent when a difference there between is not emphasized.

11. Number of Non-Overlapped CCEs

In the NR system, a number of non-overlapped CCEs affects complexity and power consumption of channel estimation performed by the terminal. Because the processing capability of the terminal is limited, the terminal has a maximum number that is of non-overlapped CCEs and that can be supported in a unit time.

In case of different numerologies, maximum numbers that are of non-overlapped CCEs that can be supported by the terminal in each slot are also different. Table 3 shows maximum numbers that are of non-overlapped CCEs that can be supported by the terminal in each slot in case of different numerologies in a non-carrier aggregation scenario (namely, a single serving cell scenario).

TABLE 3

| $\mu$ | Maximum number of non-overlapped CCEs that is supported by a terminal in each slot in each serving cell |
|---|---|
| 0 | 56 |
| 1 | 56 |
| 2 | 48 |
| 3 | 32 |

Specifically, as shown in Table 3, when $\mu=\mu0=0$, SCS=15 kHz, and a slot unit corresponding to SCS=15 kHz is a slot 1. In the slot 1, a maximum number that is of non-overlapped CCEs and that can be supported by the terminal is 56. Likewise, when $\mu=\mu1=1$, SCS=30 kHz, and a slot unit corresponding to SCS=30 kHz is a slot 2. In the slot 2, a maximum number that is of non-overlapped CCEs and that can be supported by the terminal is 56. Likewise, when $\mu=\mu2=2$, SCS=60 kHz, and a slot unit corresponding to SCS=60 kHz is a slot 3. In the slot 3, a maximum number that is of non-overlapped CCEs and that can be supported by the terminal is 48. Likewise, when $\mu=\mu3=3$, SCS=120 kHz, and a slot unit corresponding to SCS=120 kHz is a slot 4. In the slot 4, a maximum number that is of non-overlapped CCEs and that can be supported by the terminal is 32.

In discussion of NR Rel-15, because a capability of blindly detecting a PDCCH in a slot is limited, a maximum number of PDCCH candidates in a slot in a serving cell needs to be defined, to indicate a base station to configure a search space.

During non-carrier aggregation (that is, in a single serving cell scenario), maximum numbers of PDCCH candidates that can be supported by the terminal in each slot in case of different carriers may be determined based on Table 2. During carrier aggregation, specific consideration needs to be made.

In one manner, when all aggregated carriers have a same numerology, a maximum number of PDCCH candidates that can be supported by the terminal in each slot is still determined based on Table 2.

Specifically, when a number X of aggregated carriers supported by the terminal is less than or equal to 4, the maximum number of PDCCH candidates that can be supported by the terminal in each slot is equal to X*M. M={44, 36, 22, 20}, where 44 corresponds to a maximum number of PDCCH candidates on a carrier whose SCS is equal to 15 kHz, 36 corresponds to a maximum number of candidate PDCCHs on a carrier whose SCS is equal to 30 kHz, 22 corresponds to a maximum number of PDCCH candidates on a carrier whose SCS is equal to 60 kHz, and 20 corresponds to a maximum number of PDCCH candidates on a carrier whose SCS is equal to 120 kHz. For example, when an SCS of a carrier is equal to 15 kHz, if a number of aggregated carriers that can be supported by the terminal is 2, a total maximum number of PDCCH candidates that can be supported by the terminal on the two aggregated carriers in each slot is equal to 2*44=88.

When the number X of aggregated carriers supported by the terminal is greater than 4, the terminal needs to report a parameter y related to the maximum number of PDCCH candidates that can be supported by the terminal in each slot to the base station, where y is an integer in {4, . . . , 16}. A total maximum number of PDCCH candidates that can be supported by the terminal on all the aggregated carriers in each slot is equal to y*M. For example, when an SCS of an aggregated carrier is equal to 15 kHz, if a value of y reported by the terminal is equal to 5, a total maximum number of PDCCH candidates that can be supported by the terminal on all the aggregated carriers in each slot is equal to 5*44=220.

Similarly, during non-carrier aggregation, maximum numbers that are of non-overlapped CCEs that can be supported by the terminal in each slot in case of different carriers may be determined based on Table 3. During carrier aggregation, specific consideration needs to be made.

In one manner, when all aggregated carriers have a same numerology, a maximum number that is of non-overlapped CCEs and that can be supported by the terminal in each slot is still determined based on Table 3.

Specifically, when a number X of aggregated carriers supported by the terminal is less than or equal to 4, the maximum number that is of non-overlapped CCEs and that can be supported by the terminal in each slot is equal to X*N. N={56, 56, 48, 32}, where {56, 56, 48, 32} corresponds to a maximum number of non-overlapped CCEs that is supported on a carrier whose SCS is equal to {15 kHz, 30 kHz, 60 kHz, 120 kHz}. For example, when an SCS of a carrier is equal to 15 kHz, if a number of aggregated carriers that can be supported by the terminal is 2, a maximum number that is of non-overlapped CCEs and that can be supported by the terminal on the two aggregated carriers in each slot is equal to 2*56=112.

When the number X of aggregated carriers supported by the terminal is greater than 4, the terminal needs to report a parameter y to the base station, where y is an integer in {4, . . . , 16}. A total maximum number that is of non-overlapped CCEs and that can be supported by the terminal on all the aggregated carriers in each slot is equal to y*N. For example, when an SCS of an aggregated carrier is equal to 15 kHz, if a value of y reported by the terminal is equal to 5, a total maximum number that is of non-overlapped CCEs and that can be supported by the terminal on all the aggregated carriers in each slot is equal to 5*56=280.

When determining the maximum number of PDCCH candidates or the maximum number of non-overlapped CCEs, a case in which numerologies corresponding to component carriers in carrier aggregation are the same is considered, and a case in which SCSs of the component carriers are different is not considered.

In view of this, the embodiments of this application provide a parameter determining method, so that when numerologies corresponding to component carriers in carrier aggregation are different, a maximum number of PDCCH candidates or a maximum number that is of non-overlapped CCEs and that can be supported by a terminal in each slot is determined.

The following describes the embodiments of this application in detail with reference to the accompanying drawings.

It should be noted that in the embodiments of this application, "predefinition" may be implemented by pre-storing, in a device (for example, including a terminal device and/or a network device), corresponding code, a corresponding table, or another manner that may be used to indicate related information. A specific implementation is not limited in this application. For example, the predefinition may refer to defining in a protocol.

It should be further noted that "storing" in the embodiments of this application may refer to storing in one or more memories. The one or more memories may be separately disposed, or may be integrated into an encoder, a decoder, a processor, or a communications apparatus. Alternatively, a part of the one or more memories may be separately disposed, and another part of the memories may be integrated into a decoder, a processor, or a communications apparatus. The memory may be a storage medium in any form. This is not limited in this application.

It should be further noted that the "protocol" may be a standard protocol in the communications field, for example, may include an LTE protocol, an NR protocol, and a related protocol applied to a future communications system. This is not limited in this application.

It should be further noted that in the embodiments of this application, the nouns "network" and "system" are usually interchangeably used, but meanings of the nouns can be understood by a person skilled in the art. The terms "of", "corresponding (relevant)", and "corresponding to" may be mixedly used sometimes. It should be noted that meanings expressed by the terms are consistent when differences of the terms are not emphasized.

It should be further noted that in the embodiments of this application, "at least one" may represent "one or more". For example, that at least one of a manner A, a manner B, or a manner C is used for implementation represents that the manner A is used for implementation, the manner B is used for implementation, or the manner C is used for implementation; or may represent that the manner A and the manner B are used for implementation, the manner B and the manner C are used for implementation, the manner A and the manner C are used for implementation; or may represent that the manner A, the manner B, and the manner C are used for implementation. Similarly, "at least two" may represent "two or more".

It should be further noted that in the embodiments below, "first", "second", "third", and the like are merely intended to distinguish between different objects, for example, distinguish between different corresponding component carriers or serving cells, but should not constitute any limitation on this application.

It should be further noted that the term "and/or" describes an association relationship between associated objects and represents that three relationships may exist. For example, A and/or B may represent the following three cases: Only A exists, both A and B exist, and only B exists. The character "/" generally indicates that association objects are in an "or" relationship, but may also indicate an "and/or" relationship between the association objects. A specific meaning depends on a context. "At least one" means one or more; "At least one of A and B", similar to "A and/or B", describes an association relationship between associated objects and represents that three relationships may exist. For example, at least one of A and B may represent that: Only A exists, both A and B exist, and only B exists. A number of As is not limited, and may be one or more; and a number of Bs is not limited, and may be one or more.

The following describes the technical solutions provided in this application in detail with reference to the accompanying drawings.

It should be understood that the technical solutions in this application may be applied to a wireless communications system, for example, the communications system 100 shown in FIG. 1. The communications system may include at least one network device and at least one terminal device, and the network device and the terminal device may communicate with each other through a wireless air interface. For example, the network device in the communications system may correspond to the network device 111 or the network device 113 shown in FIG. 1, and the terminal device may correspond to the terminal device 121 shown in FIG. 1.

FIG. 6 is a schematic diagram of a parameter determining method according to an embodiment of this application. The method 100 includes step 110 and step 120.

110: A network device configures a plurality of serving cells for a terminal, where at least two of the plurality of serving cells have different subcarrier spacings.

120: The network device determines, based on at least one of subcarrier spacings of the plurality of serving cells, a maximum number of physical downlink control channel (PDCCH) candidates monitored by the terminal in a unit time.

Figure 7:
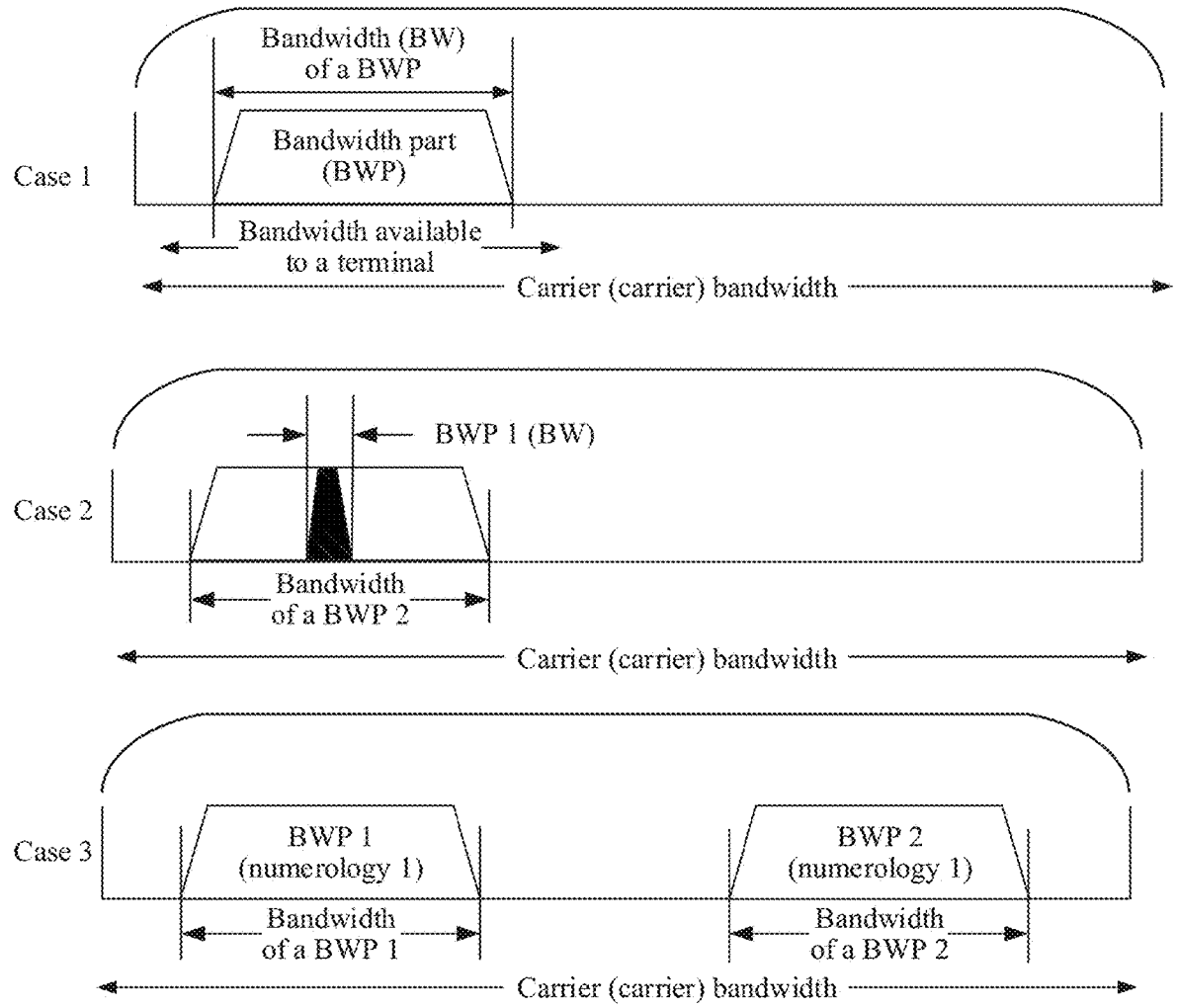
FIG. 7 is a schematic diagram of a BWP according to an embodiment of this application.

A carrier of a base station in an NR system has a broader bandwidth than an LTE carrier. For example, a bandwidth of an NR carrier may be 100 M. Different terminals have different radio frequency capabilities, and can support different maximum bandwidths. Therefore, a concept of a bandwidth part (BWP) is introduced. FIG. 7 is a schematic diagram of a BWP. A BWP is a group of contiguous RB resources on a carrier. Different BWPs may occupy frequency domain resources that partially overlap but have different bandwidths, or may be bandwidth resources that have different numerologies but may not overlap with each other in frequency domain. In NR Rel-15, a serving cell may be configured with a maximum of four BWPs. For example, there are four uplink BWPs and four downlink BWPs in frequency division duplex (FDD), and there are a total of four uplink-downlink BWP pairs in time division duplex (TDD). Only one BWP can be activated in each serving cell at a time, and the terminal sends and receives data on the active BWP.

Although the maximum of four BWPs can be configured for a serving cell, each BWP may be configured with a different numerology. However, each serving cell can activate only one BWP at a time, and a PDCCH can be sent only on the active BWP. Therefore, it may be understood that the subcarrier spacing of the serving cell mentioned in this embodiment of this application may be a subcarrier spacing of an active BWP in the serving cell.

It should be further understood that, that the network device determines, based on at least one of a plurality of subcarrier spacings of the plurality of serving cells, a maximum number of PDCCH candidates monitored by the terminal in a unit time indicates that the plurality of serving cells correspond to a plurality of subcarrier spacings, and the maximum number of PDCCH candidates monitored by the terminal in the unit time may be determined based on at least one of the plurality of subcarrier spacings.

That a network device configures a plurality of serving cells for a terminal may be understood as that the network device configures one PCell and one or more SCells for the terminal. That at least two of the plurality of serving cells have different subcarrier spacings may be understood as that subcarrier spacings of active BWPs of the at least two of the plurality of serving cells are different.

For example, the network device configures a serving cell #1, a serving cell #2, and a serving cell #3 for the terminal. The serving cell #1 includes a BWP 1, a BWP 2, a BWP 3, and a BWP 4. The serving cell #2 includes a BWP 5, a BWP 6, a BWP 7, and a BWP 8. The serving cell #3 includes a BWP 9, a BWP 10, a BWP 11, and a BWP 12. It should be understood that the BWP 1 to the BWP 12 are only used to identify BWPs configured in each cell and do not indicate ID information of BWPs in each cell. It is assumed that an active BWP in the serving cell #1 is the BWP 1, an active BWP in the serving cell #2 is the BWP 5, and an active BWP in the serving cell #3 is the BWP 9. In this case, subcarrier spacings of the BWP 1 and the BWP 5 may be different, and whether subcarrier spacings of remaining BWPs are the same is not limited in this embodiment of this application. Alternatively, subcarrier spacings of the BWP 1 and the BWP 9 may be different, and whether subcarrier spacings of remaining BWPs are the same is not limited in this embodiment of this application. Alternatively, subcarrier spacings of the BWP 5 and the BWP 9 may be different, and whether subcarrier spacings of remaining BWPs are the same is not limited in this embodiment of this application. Alternatively, subcarrier spacings of the BWP 1, the BWP 5, and the BWP 9 may be different, and whether subcarrier spacings of remaining BWPs are the same is not limited in this embodiment of this application.

This embodiment of this application mainly focuses on how to determine the maximum number of PDCCH candidates for the terminal during aggregation of a plurality of carriers. In this embodiment of this application, the determining the maximum number of PDCCH candidates monitored by the terminal in the unit time may be understood as determining a unified value as a total maximum number of PDCCH candidates supported by all aggregated carriers. Alternatively, the determining step may be understood as: separately determining a maximum number of PDCCH candidates, in each serving cell, monitored by the terminal in the unit time. That is, maximum numbers of PDCCH candidates, in serving cells, monitored by the terminal may be the same or different, the terminal does not set a unified value for all aggregated carriers, and the maximum number of PDCCH candidates monitored by the terminal in the unit time is a combination of the maximum numbers of PDCCH candidates in the serving cells. Alternatively, maximum numbers of PDCCH candidates, in serving cells, monitored by the terminal are determined to obtain a plurality of values, and a greatest value or a smallest value in the plurality of values is used as a maximum number of PDCCH candidates, in each serving cell, monitored by the terminal.

As described above, during carrier aggregation, two or more component carriers are aggregated together to support a larger transmission bandwidth. Actually, each component carrier corresponds to one independent cell, and therefore one component carrier is usually equivalent to one cell. Herein, at least one of the plurality of subcarrier spacings of the plurality of serving cells may be understood as a subcarrier spacing of a plurality of carriers (for example, a plurality of active BWPs).

In this embodiment of this application, a limitation is imposed on a number of aggregated carriers, and two or more carriers may be aggregated. For ease of understanding, the following uses aggregation of X carriers as an example for description. In the following content, for brief description and without loss of generality, the X carriers are denoted as a carrier #1, a carrier #2, . . . , and a carrier #X respectively.

It should be understood that aggregated carriers may include two or more carriers. In this embodiment of this application, aggregation of only two carriers is used as an example for description. However, this imposes no limitation on the protection scope of this application.

In this embodiment of this application, a case in which numerologies corresponding to the aggregated carriers are partially or completely different is mainly considered. For example, the carrier #1 and the carrier #2 correspond to different numerologies. With reference to Table 1, an example in which the carrier #1 corresponds to µ0 and the carrier #2 corresponds to µ1 is used for description. It can be learned from Table 1 that carrier #1 corresponds to a subcarrier spacing of 15 kHz, and the carrier #2 corresponds to a subcarrier spacing of 30 kHz. It can be learned from Table 2 that on the carrier #1, a maximum number of PDCCH candidates that can be supported by the terminal in a slot 1 corresponding to the subcarrier spacing is 44, and on the carrier #2, a maximum number of PDCCH candidates that can be supported by the terminal in a slot 2 corresponding to the subcarrier spacing is 36. The terminal may also obtain, by querying Table 2, the maximum number of PDCCH candidates that can be supported by the terminal, and monitor a PDCCH based on the found maximum number of PDCCH candidates.

It should be understood that the plurality of serving cells mentioned in this embodiment of this application may refer to a plurality of carriers in carrier aggregation. For example, a serving cell 1 and a serving cell 2 may refer to a carrier #1 in the serving cell 1 and a carrier #2 in the serving cell in carrier aggregation. In this embodiment of this application, for ease of understanding, an example in which aggregated carriers represent a plurality of serving cells is used for description.

It should be further understood that the example in which the carrier #1 corresponds to µ0 and the carrier #2 corresponds to µ1 is merely used for description, and this embodiment of this application is not limited thereto. In the following content, without loss of generality, subcarrier spacings corresponding to the carrier #1 and the carrier #2 are denoted as an SCS 1 and an SCS 2 respectively, time units corresponding to the carrier #1 and the carrier #2 are denoted as a slot 1 and a slot 2 respectively, a maximum number of PDCCH candidates that can be supported by the terminal in each slot 1 on the carrier #1 is denoted as A, and a maximum number of PDCCH candidates that can be supported by the terminal on the carrier #2 in each slot 2 is denoted as A2.

The following describes how to determine the maximum number of PDCCH candidates. The determining the maximum number of PDCCH candidates may be determining a maximum number of PDCCH candidates that can be supported by the terminal in a serving cell in one time unit. In this embodiment of this application, without loss of generality, an example of determining a maximum number of PDCCH candidates in a reference time unit (namely, an example of the unit time) is used for description. It should be understood that the reference time unit herein may be a time unit.

It should be noted that the reference time unit mentioned in this embodiment of this application represents the unit time mentioned in this application. For ease of understanding, this embodiment of this application is described by using the reference time unit as an example.

Optionally, the determining, by the network device based on at least one of subcarrier spacings of the plurality of serving cells, a maximum number of PDCCH candidates monitored by the terminal in a reference time unit includes: determining, by the network device based on a number of the plurality of serving cells and a number of PDCCH candidates that corresponds to a subcarrier spacing of a first serving cell in the reference time unit, the maximum number of PDCCH candidates monitored by the terminal in the reference time unit, where the first serving cell is any one of the plurality of serving cells; or determining, by the network device based on a number of PDCCH candidates that corresponds to a subcarrier spacing of a second serving cell in the reference time unit and a number of PDCCH candidates that corresponds to a subcarrier spacing of a third serving cell in the reference time unit, the maximum number of PDCCH candidates monitored by the terminal in the reference time unit, where the second serving cell and the third serving cell are any two of the plurality of serving cells, and the subcarrier spacing of the second serving cell is different from the subcarrier spacing of the third serving cell; or determining, by the network device based on a number of PDCCH candidates that corresponds to a subcarrier spacing of each of the serving cells in the reference time unit, a maximum number of PDCCH candidates monitored by the terminal in the reference time unit that corresponds to each serving cell.

If numerologies corresponding to the carriers in the carrier aggregation are not completely the same, it means that corresponding time units are not completely the same. Table 2 is used as an example. When $\mu=\mu0=0$, a corresponding slot unit is a slot 1. In the slot 1, a maximum number of PDCCH candidates that can be supported by the terminal is 44. When $\mu=\mu1=1$, a corresponding slot unit is a slot 2. In the slot 2, a maximum number of PDCCH candidates that can be supported by the terminal is 36. Therefore, before the maximum number of PDCCH candidates is determined, the reference time unit (namely, an example of the unit time) may be first determined. In other words, a time range in which the maximum number of PDCCH candidates that can be supported by the terminal is measured is determined.

Optionally, the reference time unit includes first duration or predefined duration, and the first duration is a slot length corresponding to a subcarrier spacing of any one of the plurality of serving cells.

Specifically, in a possible implementation, the reference time unit is a time unit corresponding to any carrier in the aggregated carriers. For example, if the carrier #1 and the carrier #2 are aggregated, the reference time unit may be a size of the reference time unit corresponding to the carrier #1, or a size of the reference time unit corresponding to the carrier #2. Specifically, the reference time unit may be a slot length slot 1 corresponding to the subcarrier spacing of the carrier #1, or a slot length slot 2 corresponding to the subcarrier spacing of the carrier #2.

In a possible implementation, the reference time unit is a predefined time unit. For example, the predefined time unit is 1 millisecond (ms) or 0.5 ms, or the predefined time unit is a time unit configured according to a protocol.

Assuming that X carriers are aggregated, there are two solutions for determining the maximum number of PDCCH candidates. One solution is that a maximum number of PDCCH candidates is determined for each carrier. The other solution is that a unified maximum number of PDCCH candidates is determined for all carriers. After the unified maximum number of PDCCH candidates is determined, a maximum number of PDCCH candidates that can be supported on each carrier is obtained through conversion based on a number of serving cells and a carrier scheduling configuration by using the determined unified value. Details are described below.

Solution 1: When X carriers are aggregated, a maximum number of PDCCH candidates is determined for each carrier.

In this embodiment of this application, for ease of understanding, some parameters are defined with reference to Table 1 and Table 2:

T represents a reference time unit;

a slot i represents a slot corresponding to $\mu i$;

Ai represents a maximum number of PDCCH candidates that can be supported by the terminal in each slot i on a carrier corresponding to $\mu i$; and ti represents a conversion value of the carrier corresponding to $\mu i$, where $i=\{1, 2, 3, 4\}$, $\mu 1=0$, $\mu 2=1$, $\mu 3=2$, and $\mu 4=3$.

It is assumed that a carrier #i corresponds to $\mu i$. On a carrier #1, a maximum number of PDCCH candidates that can be supported by the terminal in each slot 1 is 44. On a carrier #2, a maximum number of PDCCH candidates that can be supported by the terminal in each slot 2 is 36. On a carrier #3, a maximum number of PDCCH candidates that can be supported by the terminal in each slot 3 is 22. On a carrier #4, a maximum number of PDCCH candidates that can be supported by the terminal in each slot 4 is 20.

Case 1: When each carrier is used for self-scheduling, the maximum number of PDCCH candidates may be determined in the following two implementations.

Implementation #1

When a reference time unit on each carrier is a slot corresponding to the carrier, a maximum number of PDCCH candidates that can be supported by the terminal in each slot on each carrier is the same as that in a single-carrier case. On the carrier corresponding to $\mu i$, when $\mu i=\{0, 1, 2, 3\}$, the maximum number of PDCCH candidates is correspondingly $Ai=\{44, 36, 22, 20\}$.

Figure 8:
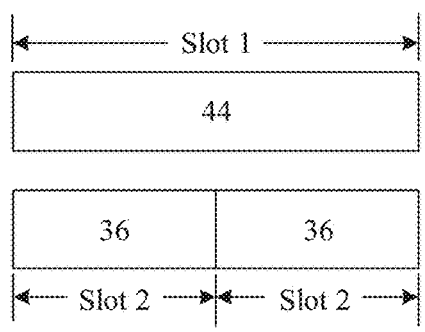
FIG. 8 is another schematic diagram of a parameter determining method according to an embodiment of this application.
Figure 9:
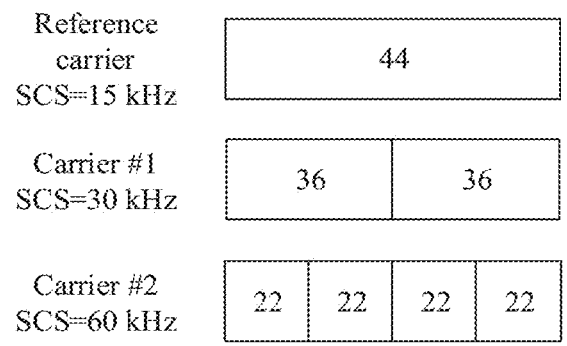
FIG. 9 is still another schematic diagram of a parameter determining method according to an embodiment of this application.

Specifically, as shown in FIG. 8, it is assumed that the carrier #1 and the carrier #2 are aggregated. As described above, a maximum number of PDCCH candidates that can be supported on the carrier #1 in a slot (the slot 1) corresponding to the carrier #1 is 44, and a maximum number of PDCCH candidates that can be supported on the carrier #2 in a slot (the slot 2) corresponding to the carrier #2 is 36. Therefore, during aggregation of the carrier #1 and the carrier #2, the maximum number of PDCCH candidates that can be supported by the terminal in each reference time unit (the slot 1) on the carrier #1 is 44, and the maximum number of PDCCH candidates that can be supported by the terminal in each reference time unit (the slot 2) on the carrier #2 is 36. Alternatively, as shown in FIG. 9, it is assumed that the carrier #1, the carrier #2, and the carrier #3 are aggregated.

As described above, a maximum number of PDCCH candidates that can be supported on the carrier #1 in a slot (the slot 1) corresponding to the carrier #1 is 44, a maximum number of PDCCH candidates that can be supported on the carrier #2 in a slot (the slot 2) corresponding to the carrier #2 is 36, and a maximum number of PDCCH candidates that can be supported on the carrier #3 in a slot (the slot 3) corresponding to the carrier #3 is 22. Therefore, during aggregation of the carrier #1, the carrier #2, and the carrier #3, the maximum number of PDCCH candidates that can be supported by the terminal in each reference time unit (the slot 1) on the carrier #1 is 44, the maximum number of PDCCH candidates that can be supported by the terminal in each reference time unit (the slot 2) on the carrier #2 is 36, and the maximum number of PDCCH candidates that can be supported by the terminal in each reference time unit (the slot 3) on the carrier #3 is 22.

Implementation #2

When a reference time unit on each carrier is a unified reference time unit, a finally determined maximum number of PDCCH candidates on each carrier is a product of an original maximum number of PDCCH candidates on each carrier and a conversion value, and the conversion value is a conversion value of a slot on each carrier and the reference time unit.

Specifically, assuming that T is twice the slot 1, and a conversion value for the carrier #1 is t1=T/slot1=2, a maximum number of PDCCH candidates that can be supported by the terminal in each reference time unit on the carrier #1 is 44*t1=88. Similarly, if a conversion value for the carrier #2 is t2=T/slot2=T/(slot1/2)=T/slot1*2=4, a maximum number of PDCCH candidates that can be supported by the terminal in each reference time unit on the carrier #2 is 36*t2=36*4=144. By analogy, maximum numbers of PDCCH candidates that can be supported by the terminal in each reference time unit on the carrier #3 and the carrier #4 may be obtained.

Therefore, when the reference time unit on each carrier is a unified reference time, the maximum number of PDCCH candidates may be expressed by the following formula:

$$Ni=Ai*(T/ti), \text{ where}$$

Ni is a maximum number of PDCCH candidates that can be supported by the terminal in each reference time unit on the carrier #i;

Ai represents a maximum number of PDCCH candidates that can be supported by the terminal in each slot i on the carrier #i; and ti represents a conversion value for the carrier #i.

Case 2: A part of carriers are configured with cross-carrier scheduling, a part of carriers are used for self-scheduling, and a part of carriers are scheduled by using another carrier.

(1) Carrier Configured with Cross-Carrier Scheduling

It is assumed that a subcarrier spacing of a scheduling carrier is less than or equal to a subcarrier spacing of a scheduled carrier.

In a possible implementation, when a number of scheduled carriers configured for the scheduling carrier is K, a maximum number of PDCCH candidates on the scheduling carrier is A(scheduling carrier)+K*A(scheduling carrier)= (K+1)*A(scheduling carrier). An added part is a multiple of K. A(scheduling carrier) represents a maximum number of PDCCH candidates in a reference time unit on the scheduling carrier.

Figure 10:
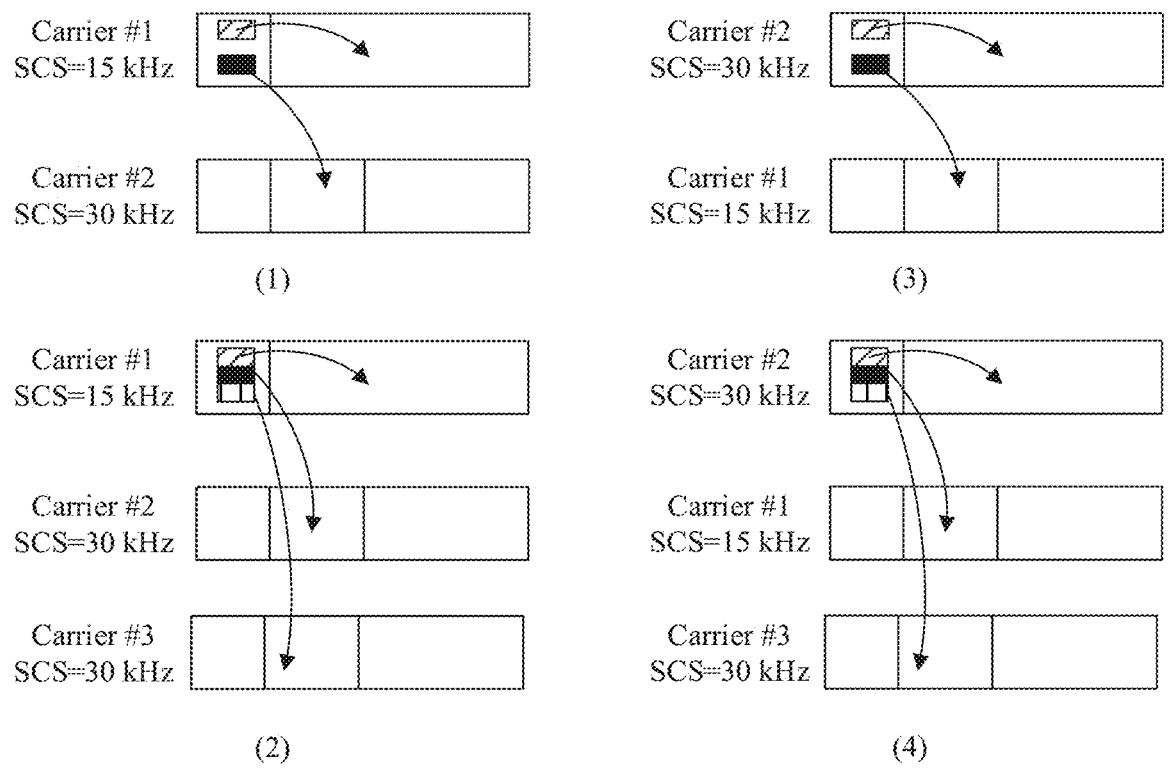
FIG. 10 is a schematic diagram of a parameter determining method according to another embodiment of this application.

Specifically, as shown in FIG. 10, in (1) in FIG. 10, K=1. In this case, the maximum number of PDCCH candidates on the scheduling carrier may be equal to A(scheduling carrier)+A(scheduling carrier)=A(scheduling carrier)*2. The first A(scheduling carrier) represents a maximum number of PDCCH candidates required when the carrier is used for scheduling itself, and the second A(scheduling carrier) represents a maximum number of PDCCH candidates required when the carrier is used for scheduling another carrier. Specific calculation indicated in (1) in FIG. 10 is A(scheduling carrier)+A(scheduling carrier)=44+44=44*2=88. In (2) in FIG. 10, K=2. In this case, the maximum number of PDCCH candidates on the scheduling carrier may be equal to A(scheduling carrier)+A(scheduling carrier)*2. Specific calculation is 44+2*44=132.

Alternatively, in another possible implementation, as shown in FIG. 10, a maximum number of PDCCH candidates on the carrier may be equal to A(scheduling carrier)+ A(scheduled carrier)*$2^{\mu(scheduled\ carrier)-\mu(scheduling\ carrier)}$. The first A(scheduling carrier) represents a maximum number of PDCCH candidates required when the carrier is used for scheduling itself, and the second A(scheduled carrier) represents a maximum number of PDCCH candidates required by the scheduled carrier. When a configured number of scheduling carriers is K, a general formula is:

$$N=A(\text{scheduling carrier})+\Sigma\{A(\text{scheduled carrier})*2^{\mu(scheduled\ carrier)-\mu(scheduling\ carrier)}\},$$

where

N represents the maximum number of PDCCH candidates;

A(scheduling carrier) represents a maximum number of PDCCH candidates in a reference time unit on the scheduling carrier; and $\Sigma\{A(\text{scheduled carrier})*2^{\mu(scheduled\ carrier)-\mu(scheduling\ carrier)}\}$ represents that each scheduled carrier is multiplied by $2^{\mu(scheduled\ carrier)-\mu(scheduling\ carrier)}$, and multiplication results are added up.

Specifically, as shown in FIG. 10, in (1) in FIG. 10, a maximum number of PDCCH candidates on a carrier #1 (a scheduling carrier) is 44+36*2=116. In (2) in FIG. 10, a maximum number of PDCCH candidates on the carrier #1 is 44+36*2+36*2=188.

It is assumed that a subcarrier spacing of a scheduling carrier is greater than a subcarrier spacing of a scheduled carrier.

In a possible implementation, in (2) in FIG. 10, a maximum number of PDCCH candidates on the carrier may be equal to A(scheduling carrier)+A(scheduling carrier)=A (scheduling carrier)*2. The first A(scheduling carrier) represents a maximum number of PDCCH candidates required when the carrier is used for scheduling itself, and the second A(scheduling carrier) represents a maximum number of PDCCH candidates required when the carrier is used for scheduling another carrier. When a configured number of scheduling carriers is K, a general formula is: A(scheduling carrier)+K*A(scheduling carrier)=(K+1)*A(scheduling carrier). An added part is a multiple of K.

Specifically, specific calculation shown in (3) in FIG. 10 is 36+36*2=36*3=108.

Alternatively, in another possible implementation, in (2) in FIG. 10, a maximum number of PDCCH candidates on the carrier may be equal to A(scheduling carrier)+A(scheduled carrier)/$2^{\mu(scheduled\ carrier)-\mu(scheduled\ carrier)}$. The first A(scheduling carrier) represents a maximum number of PDCCH candidates required when the carrier is used for scheduling itself, and the second A(scheduled carrier) represents a maximum number of PDCCH candidates required by the scheduled carrier. When a configured number of scheduling carriers is K, a general formula is:

$$N=A(\text{scheduling carrier})+\Sigma\{A(\text{scheduled carrier})/2^{\mu(\text{scheduled carrier})-\mu(\text{scheduled carrier})}\},$$

where

N represents the maximum number of PDCCH candidates;

A(scheduling carrier) represents a maximum number of PDCCH candidates in a reference time unit on the scheduling carrier; and $\Sigma\{A(\text{scheduled carrier})/2^{\mu(\text{scheduling carrier})-\mu(\text{scheduled carrier})}\}$ represents that each scheduled carrier is divided by $2^{\mu(\text{scheduling carrier})-\mu(\text{scheduled carrier})}$, and results of the division are added up.

Specifically, as shown in FIG. 10, in (3) in FIG. 10, a maximum number of PDCCH candidates on a carrier #1(a scheduling carrier) is 36+44/2=58. In (4) in FIG. 10, a maximum number of PDCCH candidates on the carrier #1 is 36+44/2+36=94.

(2) Self-scheduling Carrier

Determining of a maximum number of PDCCH candidates on the self-scheduling carrier is similar to that in the case 1 in which each carrier is used for self-scheduling. For brevity, details are not described herein again.

For example, the maximum number of PDCCH candidates on the self-scheduling carrier may be determined according to the implementation #1. To be specific, when a reference time unit on each carrier is a slot corresponding to the carrier, a maximum number of PDCCH candidates that can be supported by the terminal in each slot on each carrier is the same as that in the single-carrier case.

Alternatively, the maximum number of PDCCH candidates on the self-scheduling carrier may be determined according to the implementation #2. To be specific, when a reference time unit on each carrier is a unified reference time, a finally determined maximum number of PDCCH candidates on each carrier is a product of an original maximum number of PDCCH candidates on each carrier and a conversion value, and the conversion value is a conversion value of a slot on each carrier and the reference time.

(3) Carrier scheduled by using another carrier: PDCCH blind detection is not required. That is, a number of PDCCHs is 0.

Solution 2: When X carriers are aggregated, a unified maximum number of PDCCH candidates is determined for all the carriers.

Case A: One reference subcarrier spacing is used for calculation. For example, regardless of a subcarrier spacing of a serving cell, calculation is performed based on a subcarrier spacing of 15 kHz, and the unified value is N=X*44.

N is the unified maximum number of PDCCH candidates, and X is a number of aggregated carriers.

When X>4, as shown in FIG. 11, the network device receives a parameter y that is reported by the terminal and that is related to the maximum number of PDCCH candidates that can be supported by the terminal, where y is an integer in {4, . . . , 16}. In this case, N=y*44.

Case B:

In an implementation, N is equal to a number of PDCCH candidates that corresponds to a smallest subcarrier spacing of the serving cells multiplied by a number of carriers.

Specific descriptions are provided with reference to FIG. 8. As shown in FIG. 8, a subcarrier spacing of a carrier #1 is 15 kHz, and a subcarrier spacing of a carrier #2 is 30 kHz. In this case, N is equal to a number of PDCCH candidates that corresponds to the carrier #1 multiplied by a number of carriers, that is, is equal to 44*2=88.

In an implementation, N is equal to a number of PDCCH candidates that corresponds to a largest subcarrier spacing of the serving cells multiplied by a number of carriers.

Specific descriptions are provided with reference to FIG. 8. As shown in FIG. 8, a subcarrier spacing of a carrier #1 is 15 kHz, and a subcarrier spacing of a carrier #2 is 30 kHz. In this case, N is equal to a number of PDCCH candidates that corresponds to the carrier #2 multiplied by a number of carriers, that is, is equal to 36*2=72.

In an implementation, N is equal to a sum of a number of PDCCH candidates that corresponds to each subcarrier spacing of the serving cells.

Specific descriptions are provided with reference to FIG. 8. As shown in FIG. 8, a subcarrier spacing of a carrier #1 is 15 kHz, and a subcarrier spacing of a carrier #2 is 30 kHz. In this case, N is equal to a number of PDCCH candidates that corresponds to the carrier #1 plus a number of PDCCH candidates that corresponds to the carrier #2, that is, is equal to 44+36=80.

Alternatively, when X>4, as shown in FIG. 11, the network device receives a parameter y that is reported by the terminal and that is related to the maximum number of PDCCH candidates that can be supported by the terminal, where y is an integer in {4, . . . , 16}.

In an implementation, N is equal to a number of PDCCH candidates that corresponds to a smallest subcarrier spacing of the serving cells multiplied by y.

Specifically, FIG. 11 shows a case in which the number X of carriers is greater than 4. As shown in FIG. 11, a carrier #1, a carrier #2, a carrier #3, a carrier #4, and a carrier #5 are aggregated. In this case, the maximum number N of PDCCH candidates may be a number of PDCCH candidates that corresponds to a smallest subcarrier spacing of the serving cells multiplied by y, that is, is equal to A1*y=44*y.

In an implementation, N is equal to a number of PDCCH candidates that corresponds to a largest subcarrier spacing of the serving cells multiplied by y.

Specifically, FIG. 11 shows a case in which the number X of carriers is greater than 4. As shown in FIG. 11, a carrier #1, a carrier #2, a carrier #3, a carrier #4, and a carrier #5 are aggregated. In this case, the maximum number N of PDCCH candidates may be a number of PDCCH candidates that corresponds to a largest subcarrier spacing of the serving cells multiplied by y, that is, is equal to A2*y=36*y.

Case C:

When a reference time unit on each carrier is a unified reference time, a slot with a smallest subcarrier spacing may be used as the reference time unit, or a slot with a largest subcarrier spacing may be used as the reference time unit. Descriptions are separately provided below.

In a possible implementation, a slot with a smallest subcarrier spacing is used as the reference time unit for conversion, and the unified value is calculated.

Specifically, with reference to FIG. 8, a carrier #1 has a subcarrier spacing of 15 kHz and corresponds to a slot 1, and a maximum number A1 of PDCCH candidates on the carrier #1 is 44; a carrier #2 has a subcarrier spacing of 30 kHz and corresponds to a slot 2. It is assumed that the reference time unit T is the slot 1, and a maximum number A2 of PDCCH candidates on the carrier #2 is 36. Duration of the slot 2 is half that of the slot 1. Therefore, a conversion value for the carrier #2 is t2=T/slot2=2. In this case, in the reference time unit, the maximum number N of PDCCH candidates that can be supported by the terminal is N=A1+t2*A2=44+2*36=116.

In a possible implementation, a slot with a largest subcarrier spacing is used as the reference time unit for conversion, and the unified value is calculated.

Specifically, with reference to FIG. 8, a carrier #1 has a subcarrier spacing of 15 kHz and corresponds to a slot 1; a carrier #2 has a subcarrier spacing of 30 kHz and corresponds to a slot 2. It is assumed that the reference time unit T is the slot 2. Duration of the slot 2 is half that of the slot 1. Therefore, a conversion value for the carrier #1 is t1=T/slot1=0.5. In this case, in the reference time unit, the maximum number N of PDCCH candidates that can be supported by the terminal is N=t1+A1*A2=0.5*44+36=58.

Optionally, when X>4, a parameter reported by the terminal may be redefined.

In an optional implementation, when the number X of carriers that can be aggregated and that are supported by the terminal is greater than 4, the terminal may report numerology information corresponding to a capability y, for example, the reported information corresponds to SCS=15 kHz, or report $\mu$=0. In this case, the maximum number of PDCCH candidates that can be supported by the terminal in each reference time unit is equal to y*A (A corresponds to reported p). Specifically, when y=5, the maximum number of PDCCH candidates that can be supported by the terminal in each reference time unit is equal to 5*44=220.

It should be noted that after the maximum number N of PDCCH candidates that can be supported by the terminal is calculated, when performing configuration on each carrier, a network side needs to perform conversion by considering a number of scheduled carriers on a scheduling carrier. As shown in FIG. 12, a maximum number of PDCCH candidates configured on a carrier #1 is equal to the unified value N multiplied by ⅖. This is because not only the carrier #1 is used for self-scheduling, but also there is a scheduled carrier on the carrier #1. N*⅖ is equivalent to a share occupied by two carriers. A maximum number of PDCCH candidates configured on each of the other carriers is equal to the unified value N divided by 5.

Specifically, when the number X of carriers that can be aggregated and that are supported by the terminal is greater than 4, the terminal may report a parameter related to the maximum number of PDCCH candidates that can be supported by the terminal in each reference time unit. The related parameter may be a capability parameter of different numerologies. As shown in FIG. 11, two numerologies are used herein: SCS=15 kHz and SCS=30 kHz. X1 represents a number of carriers whose SCS is 15 kHz, where X1=2. X2 represents a number of carriers whose SCS is 30 kHz, where X2=3.

In a possible implementation, the reference time unit is defined by using a numerology with the smaller SCS. In this case, the maximum number of PDCCH candidates that can be supported by the terminal in the reference time unit is:

$$N = y*(X1/X)*A0 + y*(X2/X)*A1*2^{\mu 1-\mu 0}, \text{ where}$$

$\mu 1$ corresponds to a $\mu$ value of the larger SCS, and $\mu 2$ corresponds to a $\mu$ value of the smaller SCS.

In another possible implementation, the unit time is defined by using a numerology with the larger SCS.

In this case, the maximum number of PDCCH candidates that can be supported by the terminal in the reference time unit is:

$$N = y*(X1/X)*A0 + y*(X2/X)*A1 \text{ or } N = y*(X1/X)*(A0/2^{\mu 1-\mu 0}) + y*(X2/X)*A1.$$

Another possibility is to re-define the parameter reported by the terminal. For example, if y reported by the terminal is divided into y1 and y2 (corresponding to capability parameters of different numerologies, where $\mu$ values respectively corresponding to y1 and y2 need to be specified), y1 and y2 are used to substitute for y*(X1/X) and y*(X2/X) in the foregoing formula.

That is, $y1=y*(X1/X)$, and $y2=y*(X2/X)$.

In this case, the maximum number N of PDCCH candidates that can be supported by the terminal may be:

$$N = y1*A1 + y2*A2*2^{\mu 1-\mu 0};$$

$$N = y1*A1 + y2*A2; \text{ or}$$

$$N = y1*(A1/2^{\mu 1-\mu 0}) + y2*A2.$$

Case D:

When the number X of aggregated carriers is greater than 4, for example, a carrier #1, a carrier #2, a carrier #3, a carrier #4, and a carrier #5 shown in FIG. 12 are aggregated, and cross-carrier scheduling is configured for the aggregated carriers. As shown in FIG. 12, the carrier #1 is a scheduling carrier, and the carrier #2 is a scheduled carrier. In this case, the maximum number N of PDCCH candidates that can be supported by the terminal in each reference time unit may be determined in a manner similar to that in FIG. 10. For example, a maximum number of PDCCH candidates on the scheduling carrier is used to calculate a maximum number of PDCCH candidates on all carriers, that is, $$N = 2*A1 + A2 + A1 + A2 = 2*44 + 36 + 44 + 36 = 204.$$

According to this embodiment of this application, the network device may determine the maximum number of PDCCH candidates based on any one of the plurality of serving cells and the number of aggregated carriers. Alternatively, the network device may further determine the maximum number of PDCCH candidates by comprehensively considering a number of PDCCH candidates that corresponds to each carrier for the carrier aggregation in the unit time. Alternatively, the network device may further determine a maximum number of PDCCH candidates that corresponds to the plurality of serving cells, based on a reference serving cell (for example, when the unit time is predefined duration).

The foregoing describes, with reference to FIG. 6 to FIG. 12, how to determine the maximum number of PDCCH candidates. The following describes how to determine a maximum number of non-overlapped CCEs. The number of CCEs is directly related to the maximum number of PDCCH candidates. Therefore, a method for determining the number of non-overlapped CCEs is similar to the method for determining the maximum number of PDCCH candidates. For brevity, details are not described herein again.

Figures 13, 14:
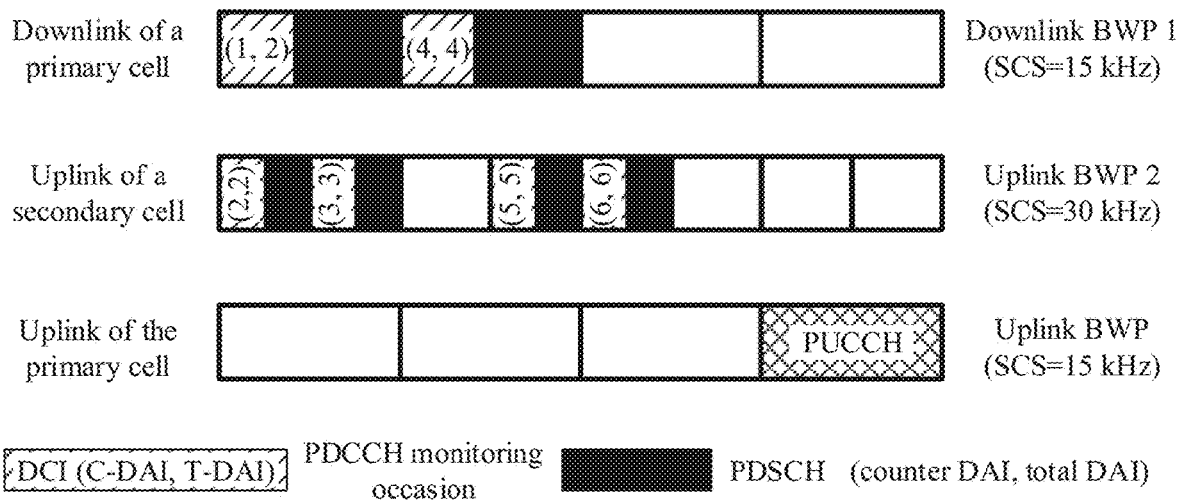
FIG. 13 is a schematic diagram of a parameter determining method according to still another embodiment of this application.
FIG. 14 is a schematic diagram of a manner of calculating a dynamic codebook.

FIG. 13 is a schematic diagram of a parameter determining method according to an embodiment of this application. The method 200 includes step 210 and step 220.

210: A network device configures a plurality of serving cells for a terminal, where at least two of the plurality of serving cells have different subcarrier spacings.

220: The network device determines, based on at least one of subcarrier spacings of the plurality of serving cells, a maximum number of non-overlapped CCEs monitored by the terminal in a unit time.

In this embodiment of this application, the determining a maximum number of non-overlapped CCEs monitored by the terminal in a unit time may be understood as determining a unified value as a maximum number of non-overlapped CCEs on each aggregated carrier. Alternatively, the determining step may be understood as: separately determining a maximum number of non-overlapped CCEs, in each serving cell, monitored by the terminal in the unit time. That is, maximum numbers of non-overlapped CCEs, in serving cells, monitored by the terminal may be the same or different. Alternatively, maximum numbers of non-overlapped CCEs, in serving cells, monitored by the terminal are determined to obtain a plurality of values, and a greatest value or a smallest value in the plurality of values is used as a maximum number of non-overlapped CCEs, in each serving cell, monitored by the terminal.

The following describes how to determine the maximum number of non-overlapped CCEs. The determining the maximum number of non-overlapped CCEs may be determining a maximum number that is of non-overlapped CCEs and that can be supported by the terminal in a serving cell in one time unit. In this embodiment of this application, without loss of generality, an example of determining a maximum number of non-overlapped CCEs in a reference time unit (namely, an example of the unit time) is used for description. It should be understood that the reference time unit herein may be a time unit.

It should be noted that the reference time unit mentioned in this embodiment of this application represents the unit time mentioned in this application. For ease of understanding, this embodiment of this application is described by using the reference time unit as an example.

Optionally, the reference time unit includes first duration or predefined duration, and the first duration is a slot length corresponding to a subcarrier spacing of any one of the plurality of serving cells.

Specifically, in a possible implementation, the reference time unit is a time unit corresponding to any carrier in the aggregated carriers. For example, if the carrier #1 and the carrier #2 are aggregated, the reference time unit may be a size of a time unit corresponding to the carrier #1, or a size of a time unit corresponding to the carrier #2. Specifically, the reference time unit may be a slot length slot 1 corresponding to the subcarrier spacing of the carrier #1, or a slot length slot 2 corresponding to the subcarrier spacing of the carrier #2. The terminal may also obtain, by querying Table 3, the maximum number that is of non-overlapped CCEs and that can be supported by the terminal, and monitor a PDCCH based on the found maximum number of non-overlapped CCEs.

In a possible implementation, the reference time unit is a predefined time unit. For example, the predefined time unit is 1 millisecond (ms) or 0.5 ms, or the predefined time unit is a time unit configured according to a protocol.

Assuming that X carriers are aggregated, there are two solutions for determining the maximum number of non-overlapped CCEs. One solution is that a maximum number of non-overlapped CCEs is determined for each carrier. The other solution is that a unified maximum number of non-overlapped CCEs is determined for all carriers. After the unified maximum number of non-overlapped CCEs is determined, a maximum number that is of non-overlapped CCEs and that can be supported on each carrier is obtained through conversion based on a number of serving cells and a carrier scheduling configuration by using the determined unified value. Details are described below.

Solution 1: When X carriers are aggregated, a maximum number of non-overlapped CCEs is determined for each carrier.

In this embodiment of this application, for ease of understanding, some parameters are defined with reference to Table 1 and Table 2:

T represents a reference time unit;
a slot i represents a slot corresponding to $\mu i$;
Bi represents a maximum number that is of non-overlapped CCEs and that can be supported by the terminal in each slot i on a carrier corresponding to $\mu i$; and
ti represents a conversion value of the carrier corresponding to $\mu i$, where i={1, 2, 3, 4}, $\mu 1$=0, $\mu 2$=1, $\mu 3$=2, and $\mu 4$=3.

It is assumed that a carrier #i corresponds to $\mu i$. On a carrier #1, a maximum number that is of non-overlapped CCEs and that can be supported by the terminal in each slot 1 is 56. On a carrier #2, a maximum number of non-overlapped CCEs that can be supported by the terminal in each slot 2 is 56. On a carrier #3, a maximum number of non-overlapped CCEs that can be supported by the terminal in each slot 3 is 48. On a carrier #4, a maximum number of non-overlapped CCEs that can be supported by the terminal in each slot 4 is 32.

Case 1: When each carrier is used for self-scheduling, the maximum number of non-overlapped CCEs may be determined in the following two implementations.

Implementation #1

When a reference time unit on each carrier is a slot corresponding to the carrier, a maximum number that is of non-overlapped CCEs and that can be supported by the terminal in each slot on each carrier is the same as that in the single-carrier case. On the carrier corresponding to $\mu i$, when $\mu i$={0, 1, 2, 3}, the maximum number of non-overlapped CCEs is correspondingly Bi={56, 56, 48, 32}.

Specifically, as shown in FIG. 8, it is assumed that the carrier #1 and the carrier #2 are aggregated. As described above, a maximum number that is of non-overlapped CCEs and that can be supported on the carrier #1 in a slot (the slot 1) corresponding to the carrier #1 is 56, and a maximum number that is of non-overlapped CCEs and that can be supported on the carrier #2 in a slot (the slot 2) corresponding to the carrier #2 is 56. Therefore, during aggregation of the carrier #1 and the carrier #2, the maximum number that is of non-overlapped CCEs and that can be supported by the terminal in each reference time unit (the slot 1) on the carrier #1 is 56, and the maximum number that is of non-overlapped CCEs and that can be supported by the terminal in each reference time unit (the slot 2) on the carrier #2 is 56. Alternatively, as shown in FIG. 9, it is assumed that the carrier #1, the carrier #2, and the carrier #3 are aggregated. As described above, a maximum number that is of non-overlapped CCEs and that can be supported on the carrier #1 in a slot (the slot 1) corresponding to the carrier #1 is 56, a maximum number that is of non-overlapped CCEs and that can be supported on the carrier #2 in a slot (the slot 2) corresponding to the carrier #2 is 56, and a maximum number that is of non-overlapped CCEs and that can be supported on the carrier #3 in a slot (the slot 3) corresponding to the carrier #3 is 48. Therefore, during aggregation of the carrier #1, the carrier #2, and the carrier #3, the maximum number that is of non-overlapped CCEs and that can be supported by the terminal in each reference time unit (the slot 1) on the carrier #1 is 56, the maximum number that is of non-overlapped CCEs and that can be supported by the terminal in each reference time unit (the slot 2) on the carrier #2 is 56, and the maximum number that is of non-overlapped CCEs and that can be supported by the terminal in each reference time unit (the slot 3) on the carrier #3 is 48.

Implementation #2

When a reference time unit on each carrier is a unified reference time, a finally determined maximum number of non-overlapped CCEs on each carrier is a product of an original maximum number of non-overlapped CCEs on each carrier and a conversion value, and the conversion value is a conversion value of a slot on each carrier and the reference time.

Specifically, assuming that T is twice the slot 1, and a conversion value for the carrier #1 is t1=T/slot1=2, a maximum number that is of non-overlapped CCEs and that can be supported by the terminal in each reference time unit on the carrier #1 is 56*t1=112. Similarly, if a conversion value for the carrier #2 is t2=T/slot2=T/(slot1/2)=T/slot1*2=4, a maximum number that is of non-overlapped CCEs and that can be supported by the terminal in each reference time unit on the carrier #2 is 56*t2=56*4=224. By analogy, maximum numbers that are of non-overlapped CCEs that can be supported by the terminal in each reference time unit on the carrier #3 and the carrier #4 may be obtained.

Therefore, when the reference time unit on each carrier is a unified reference time, the maximum number of non-overlapped CCEs may be expressed by the following formula:

$$Ni=Bi*(T/ti), \text{ where}$$

Ni is a maximum number that is of non-overlapped CCEs and that can be supported by the terminal in each reference time unit on the carrier #i;

Bi represents a maximum number that is of non-overlapped CCEs and that can be supported by the terminal in each slot i on the carrier #i; and ti represents a conversion value for the carrier #i.

Case 2: Some carriers are configured with cross-carrier scheduling, some carriers are used for self-scheduling, and some carriers are scheduled by using other carriers.

(1) Carrier for which Cross-Carrier Scheduling is Configured

It is assumed that a subcarrier spacing of a scheduling carrier is less than or equal to a subcarrier spacing of a scheduled carrier.

In a possible implementation, when a number of scheduled carriers configured for the scheduling carrier is K, a maximum number of non-overlapped CCEs on the scheduling carrier is B(scheduling carrier)+K*B(scheduling carrier)=(K+1)*B(scheduling carrier). An added part is a multiple of K. B(scheduling carrier) represents a maximum number of non-overlapped CCEs in a reference time unit on the scheduling carrier.

Specifically, as shown in FIG. 10, in (1) in FIG. 10, K=1. In this case, the maximum number of non-overlapped CCEs on the scheduling carrier may be equal to B(scheduling carrier)+B(scheduling carrier)=B(scheduling carrier)*2. The first B(scheduling carrier) represents a maximum number of non-overlapped CCEs required when the carrier is used for scheduling itself, and the second B(scheduling carrier) represents a maximum number of non-overlapped CCEs required when the carrier is used for scheduling another carrier. Specific calculation indicated in (1) in FIG. 10 is B(scheduling carrier)+B(scheduling carrier)=56+56=56*2=112. In (2) in FIG. 10, K=2. In this case, the maximum number of non-overlapped CCEs on the scheduling carrier may be equal to B(scheduling carrier)+B(scheduling carrier)*2. Specific calculation is 56+2*56=168.

Alternatively, in another possible implementation, as shown in FIG. 10, a maximum number of non-overlapped CCEs on the carrier may be equal to B(scheduling carrier)+B(scheduled carrier)*$2^{\mu(scheduled\ carrier)-\mu(scheduling\ carrier)}$. The first B(scheduling carrier) represents a maximum number of non-overlapped CCEs required when the carrier is used for scheduling itself, and the second B(scheduled carrier) represents a maximum number of non-overlapped CCEs required by the scheduled carrier. When a configured number of scheduling carriers is K, a general formula is:

$$N=B(\text{scheduling carrier})+\Sigma\{B(\text{scheduled carrier})*2^{\mu(scheduled\ carrier)-\mu(scheduling\ carrier)}\},$$

where

N represents the maximum number of non-overlapped CCEs;

B(scheduling carrier) represents a maximum number of non-overlapped CCEs in a reference time unit on the scheduling carrier; and $\Sigma\{B(\text{scheduled carrier})*2^{\mu(scheduled\ carrier)-\mu(scheduling\ carrier)}\}$ represents that each scheduled carrier is multiplied by $2^{\mu(scheduled\ carrier)-\mu(scheduling\ carrier)}$, and multiplication results are added up.

Specifically, as shown in FIG. 10, in (1) in FIG. 10, a maximum number of non-overlapped CCEs on a carrier #1 (a scheduling carrier) is 56+56*2=168. In (2) in FIG. 10, a maximum number of non-overlapped CCEs on the carrier #1 is 56+56*2+56*2=280.

It is assumed that a subcarrier spacing of a scheduling carrier is greater than a subcarrier spacing of a scheduled carrier.

In a possible implementation, in (2) in FIG. 10, a maximum number of non-overlapped CCEs on the carrier may be equal to B(scheduling carrier)+B(scheduling carrier)=B(scheduling carrier)*2, where the first B(scheduling carrier) represents a maximum number of non-overlapped CCEs required when the carrier is used for scheduling itself, the second B(scheduling carrier) represents a maximum number of non-overlapped CCEs required when the carrier is used for scheduling another carrier. When a configured number of scheduling carriers is K, a general formula is: B(scheduling carrier)+K*B(scheduling carrier)=(K+1)*B(scheduling carrier). An added part is a multiple of K.

Specifically, specific calculation shown in (3) in FIG. 10 is 56+56*2=56*3=168.

Alternatively, in another possible implementation, in (2) in FIG. 10, a maximum number of non-overlapped CCEs on the carrier may be equal to B(scheduling carrier)+B(scheduled carrier)/$2^{\mu(scheduling\ carrier)-\mu(scheduled\ carrier)}$. The first B(scheduling carrier) represents a maximum number of non-overlapped CCEs required when the carrier is used for scheduling itself, and the second B(scheduled carrier) represents a maximum number of non-overlapped CCEs required by the scheduled carrier. When a configured number of scheduling carriers is K, a general formula is:

$$N=B(\text{scheduling carrier})+\Sigma\{B(\text{scheduled carrier})/2^{\mu(scheduling\ carrier)-\mu(scheduled\ carrier)}\}$$

where

N represents the maximum number of non-overlapped CCEs;

B(scheduling carrier) represents a maximum number of non-overlapped CCEs in a reference time unit on the scheduling carrier; and $\Sigma\{B(\text{scheduled carrier})/2^{\mu(scheduling\ carrier)-\mu(scheduled\ carrier)}\}$ represents that each scheduled carrier is divided by $2^{\mu(scheduling\ carrier)-\mu(scheduled\ carrier)}$, and results of the division are added up.

Specifically, as shown in FIG. 10, in (3) in FIG. 10, a maximum number of non-overlapped CCEs on a carrier #1 (a scheduling carrier) is 56+56/2=84. In (4) in FIG. 10, a maximum number of non-overlapped CCEs on the carrier #1 is 56+56/2+56=140.

(2) Self-Scheduling Carrier

Determining of a maximum number of non-overlapped CCEs on the self-scheduling carrier is similar to that in the case 1 in which each carrier is used for self-scheduling. For brevity, details are not described herein again.

For example, the maximum number of non-overlapped CCEs on the self-scheduling carrier may be determined according to the implementation #1. To be specific, when a reference time unit on each carrier is a slot corresponding to the carrier, a maximum number that is of non-overlapped CCEs and that can be supported by the terminal in each slot on each carrier is the same as that in the single-carrier case.

Alternatively, the maximum number of non-overlapped CCEs on the self-scheduling carrier may be determined according to the implementation #2. To be specific, when a reference time unit on each carrier is a unified reference time, a finally determined maximum number of non-overlapped CCEs on each carrier is a product of an original maximum number of non-overlapped CCEs on each carrier and a conversion value, and the conversion value is a conversion value of a slot on each carrier and the reference time.

(3) Carrier scheduled by using another carrier: PDCCH blind detection is not required. That is, a number of non-overlapped CCEs is 0.

Solution 2: When X carriers are aggregated, a unified maximum number of non-overlapped CCEs is determined for all carriers.

Case A: One reference subcarrier spacing is used for calculation. For example, regardless of a subcarrier spacing of a serving cell, calculation is performed based on a subcarrier spacing of 15 kHz, and the unified value is N=X*56.

N is the unified maximum number of PDCCH candidates, and X is a number of aggregated carriers.

When X>4, as shown in FIG. 11, the network device receives a parameter y that is reported by the terminal and that is related to the maximum number that is of non-overlapped CCEs and that can be supported by the terminal, where y is an integer in {4, . . . , 16}. In this case, N=y*56.

Case B:

In an implementation, N is equal to a number of non-overlapped CCEs that corresponds to a smallest subcarrier spacing of the serving cells multiplied by a number of carriers.

Specific descriptions are provided with reference to FIG. 8. As shown in FIG. 8, a subcarrier spacing of a carrier #1 is 15 kHz, and a subcarrier spacing of a carrier #2 is 30 kHz. In this case, N is equal to a number of non-overlapped CCEs that corresponds to the carrier #1 multiplied by a number of carriers, that is, is equal to 56*2=112.

In an implementation, N is equal to a number of non-overlapped CCEs that corresponds to a largest subcarrier spacing of the serving cells multiplied by a number of carriers.

Specific descriptions are provided with reference to FIG. 8. As shown in FIG. 8, a subcarrier spacing of a carrier #1 is 15 kHz, and a subcarrier spacing of a carrier #2 is 30 kHz. In this case, N is equal to a number of non-overlapped CCEs that corresponds to the carrier #2 multiplied by a number of carriers, that is, is equal to 56*2=112.

In an implementation, N is equal to a sum of a number of non-overlapped CCEs that corresponds to each subcarrier spacing of the serving cells.

Specific descriptions are provided with reference to FIG. 8. As shown in FIG. 8, a subcarrier spacing of a carrier #1 is 15 kHz, and a subcarrier spacing of a carrier #2 is 30 kHz. In this case, N is equal to a number of non-overlapped CCEs that corresponds to the carrier #1 plus a number of non-overlapped CCEs that corresponds to the carrier #2, that is, is equal to 56+56=112.

Alternatively, when X>4, as shown in FIG. 11, the network device receives a parameter y that is reported by the terminal and that is related to the maximum number that is of non-overlapped CCEs and that can be supported by the terminal, where y is an integer in {4, . . . , 16}.

In an implementation, N is equal to a number of non-overlapped CCEs that corresponds to a smallest subcarrier spacing of the serving cells multiplied by y.

Specifically, FIG. 11 shows a case in which the number X of carriers is greater than 4. As shown in FIG. 11, a carrier #1, a carrier #2, a carrier #3, a carrier #4, and a carrier #5 are aggregated. In this case, the maximum number N of non-overlapped CCEs may be a number of non-overlapped CCEs that corresponds to a smallest subcarrier spacing of the serving cells multiplied by y, that is, is equal to B1*y=56*y.

In an implementation, N is equal to a number of non-overlapped CCEs that corresponds to a largest subcarrier spacing of the serving cells multiplied by y.

Specifically, FIG. 11 shows a case in which the number X of carriers is greater than 4. As shown in FIG. 11, a carrier #1, a carrier #2, a carrier #3, a carrier #4, and a carrier #5 are aggregated. In this case, the maximum number N of non-overlapped CCEs may be a number of non-overlapped CCEs that corresponds to a largest subcarrier spacing of the serving cells multiplied by y, that is, is equal to B2*y=56*y.

Case C:

When a reference time unit on each carrier is a unified reference time, a slot with a smallest subcarrier spacing may be used as the reference time unit, or a slot with a largest subcarrier spacing may be used as the reference time unit. Descriptions are separately provided below.

In a possible implementation, a slot with a smallest subcarrier spacing is used as the reference time unit for conversion, and the unified value is calculated.

Specifically, with reference to FIG. 8, a carrier #1 has a subcarrier spacing of 15 kHz and corresponds to a slot 1, and a maximum number B1 of non-overlapped CCEs on the carrier #1 is 56; a carrier #2 has a subcarrier spacing of 30 kHz and corresponds to a slot 2. It is assumed that the reference time unit T is the slot 1, and a maximum number B2 of non-overlapped CCEs on the carrier #2 is 56. Duration of the slot 2 is half that of the slot 1. Therefore, a conversion value for the carrier #2 is t2=T/slot2=2. In this case, in the reference time unit, the maximum number N that is of non-overlapped CCEs and that can be supported by the terminal is N=B1+t2*B2=56+2*56=168.

In a possible implementation, a slot with a largest subcarrier spacing is used as the reference time unit for conversion, and the unified value is calculated.

Specifically, with reference to FIG. 8, a carrier #1 has a subcarrier spacing of 15 kHz and corresponds to a slot 1; a carrier #2 has a subcarrier spacing of 30 kHz and corresponds to a slot 2. It is assumed that the reference time unit T is the slot 2. Duration of the slot 2 is half that of the slot 1. Therefore, a conversion value for the carrier #1 is t1=T/slot1=0.5. In this case, in the reference time unit, the maximum number N that is of non-overlapped CCEs and that can be supported by the terminal is N=t1*B1+B2=0.5*56+56=84.

Optionally, when X>4, a parameter reported by the terminal may be redefined.

In an optional implementation, when the number X of carriers that can be aggregated and that are supported by the terminal is greater than 4, the terminal may report numerology information corresponding to a capability y, for example, the reported information corresponds to SCS=15 kHz, or report μ=0. In this case, the maximum number that is of non-overlapped CCEs and that can be supported by the terminal in each reference time unit is equal to y*B (reported p). Specifically, when y=5, the maximum number that is of non-overlapped CCEs and that can be supported by the terminal in each reference time unit is equal to 5*56=280.

It should be noted that after the maximum number N that is of non-overlapped CCEs and that can be supported by the terminal is calculated, when performing configuration on each carrier, a network side needs to perform conversion by considering a number of scheduled carriers on a scheduling carrier. As shown in FIG. 12, a maximum number of non-overlapped CCEs configured on a carrier #1 is equal to the unified value N multiplied by ⅖. This is because not only the carrier #1 is used for self-scheduling, but also there is a scheduled carrier on the carrier #1. N*⅖ is equivalent to a share occupied by two carriers. A maximum number of non-overlapped CCEs configured on each of the other carriers is equal to the unified value N divided by 5.

Specifically, when the number X of carriers that can be aggregated and that are supported by the terminal is greater than 4, the terminal may report a parameter related to the maximum number that is of non-overlapped CCEs and that can be supported by the terminal in each reference time unit. The related parameter may be a capability parameter of different numerologies. As shown in FIG. 11, two numerologies are used herein: SCS=15 kHz and SCS=30 kHz. X1 represents a number of carriers whose SCS is 15 kHz, where X1=2. X2 represents a number of carriers whose SCS is 30 kHz, where X2=3.

In a possible implementation, the reference time unit is defined by using a numerology with the smaller SCS. In this case, the maximum number that is of non-overlapped CCEs and that can be supported by the terminal in the reference time unit is:

$$N=y*(X1/X)*B0+y*(X2/X)*B1*2^{\mu1-\mu0}.$$

In another possible implementation, the unit time is defined by using a numerology with the larger SCS.

In this case, the maximum number that is of non-overlapped CCEs and that can be supported by the terminal in the reference time unit is:

$$N=y*(X1/X)*B0+y*(X2/X)*B1 \text{ or } N=y*(X1/X)*(B0/2^{\mu1-\mu0})+y*(X2/X)*B1, \text{ where}$$

μ1 corresponds to a μ value of the larger SCS, and μ2 corresponds to a μ value of the smaller SCS.

Another possibility is to re-define the parameter reported by the terminal. For example, if y reported by the terminal is divided into y1 and y2 (corresponding to capability parameters of different numerologies, where μ values respectively corresponding to y1 and y2 need to be specified), y1 and y2 are used to substitute for y*(X1/X) and y*(X2/X) in the foregoing formula.

That is, $y1=y*(X1/X)$, and $y2=y*(X2/X)$.

In this case, the maximum number N that is of non-overlapped CCEs and that can be supported by the terminal may be:

$$N=y1*B1+y2*B2*2^{\mu1-\mu0};$$

$$N=y1*B1+y2*B2; \text{ or}$$

$$N=y1*(B1/2^{\mu1-\mu0})+y2*B2.$$

Case D:

When the number X of aggregated carriers is greater than 4, for example, a carrier #1, a carrier #2, a carrier #3, a carrier #4, and a carrier #5 shown in FIG. 12 are aggregated, and cross-carrier scheduling is configured for the aggregated carriers. As shown in FIG. 12, the carrier #1 is a scheduling carrier, and the carrier #2 is a scheduled carrier. In this case, a maximum number N that is of non-overlapped CCEs and that can be supported by the terminal in each reference time unit may be determined in a manner similar to that in FIG. 10. For example, a maximum number of non-overlapped CCEs on the scheduling carrier is used to calculate a maximum number of non-overlapped CCEs on all carriers, that is, N=2*B1+B2+B1+B2=2*56+56+56+56=280.

According to this embodiment of this application, the network device may determine the maximum number of non-overlapped CCEs based on any one of the plurality of serving cells and the number of aggregated carriers. Alternatively, the network device may further determine the maximum number of non-overlapped CCEs by comprehensively considering a number of non-overlapped CCEs that corresponds to each carrier for the carrier aggregation in the unit time. Alternatively, the network device may further determine a maximum number of non-overlapped CCEs that corresponds to the plurality of serving cells, based on a reference serving cell (for example, when the unit time is predefined duration).

The foregoing describes, with reference to FIG. 6 to FIG. 13, how to determine the maximum number of PDCCH candidates and the maximum number of non-overlapped CCEs during aggregation of a plurality of carriers. The following analyzes the maximum number of PDCCH candidates with reference to a size of DCI.

Optionally, the maximum number of PDCCH candidates includes a number of PDCCH candidates that corresponds to formats of downlink control information DCI in different sizes; and: a total number of the formats of the DCI of the different sizes is less than or equal to M times a number that is of formats of DCI in different sizes and that corresponds to any one of the plurality of serving cells, where M is the number of the plurality of serving cells; and/or a number that is of formats of DCI in different sizes and that corresponds to a fourth serving cell is less than or equal to K times a number that is of formats of DCI in different sizes and that corresponds to one serving cell, where the fourth serving cell is a cell that performs cross-carrier scheduling and that is in the plurality of serving cells, and K is a number of serving cells for which the fourth serving cell performs the cross-carrier scheduling.

A DCI format is used to define a position of a control information field in DCI. For ease of understanding, the DCI format is first briefly described with reference to Table 4.

TABLE 4

| DCI format | Usage (Usage) |
|---|---|
| 0_0 | Scheduling an uplink shared channel in a cell or on a carrier |
| 0_1 | Scheduling an uplink shared channel in a cell or on a carrier |
| 1_0 | Scheduling a downlink shared channel in a cell or on a carrier |
| 1_1 | Scheduling a downlink shared channel in a cell or on a carrier |
| 2_0 | Indicating a slot format for a group of terminal devices |
| 2_1 | Indicating a physical resource block or an OFDM symbol to a group of terminal devices, where the terminal device assumes that no transmission for the terminal device is performed on the physical resource block or the OFDM symbol |
| 2_2 | Sending a transmit power control instruction for an uplink control channel and an uplink shared channel |

TABLE 4-continued

| DCI format | Usage (Usage) |
|---|---|
| 2_3 | Sending a transmit power control instruction for a group of channel sounding reference signals to one or more terminal devices |

A downlink control information size (DCI size) may be understood as a number of information bits included in downlink control information. If the DCI includes W information bits, the downlink control information size is W. Alternatively, a downlink control information size may be understood as a sum of a number of information bits included in DCI and a length of a cyclic redundancy check code. For example, if the DCI includes W information bits, and the length of the cyclic redundancy check code is L, the DCI size is equal to W+L. A number of DCI sizes directly affects a number of PDCCH candidates. PDCCHs with a same DCI size in a same search space are considered as one PDCCH candidate. Currently, only the single-carrier case is limited in conference discussion of NR. For example, in the single-carrier case, in each slot, the terminal supports monitoring of PDCCHs with a maximum of four different DCI sizes, that is, a total number of DCI sizes detected by the terminal cannot exceed four. In addition, a number of sizes of DCI, detected by the terminal, with cyclic redundancy check code scrambled by using a C-RNTI cannot exceed three.

When controlling a number of PDCCH candidates monitored by the terminal, the network device needs to consider monitoring configurations, of the terminal, for different DCI sizes. With reference to Table 5, the following describes two cases in which cross-carrier scheduling is not configured for aggregated carriers and cross-carrier scheduling is configured for aggregated carriers.

Case 1:
Cross-carrier scheduling is not configured for aggregated carriers.

A DCI budget (budget) in a PCell needs to meet a DCI budget requirement in the single-carrier case. For example:
  column 1, column 3, column 4, column 5/column 6
  column 1, column 3/column 4, column 5, column 6

An SCell does not need to monitor a DCI format that appears only in the PCell, for example, 1_0 (a format of DCI scrambled by using an SI-RNTI/an RA-RNTI/a T-CRNTI/a P-RNTI) and 0_0 (a format of DCI obtained by scrambling Type1-PDCCH by using a T-CRNTI/C-RNTI). Therefore, when a DCI budget is considered, DCI sizes corresponding to the fourth row, sixth row, tenth row, and eleventh row in the second column in Table 5 can be excluded from the DCI budget in the SCell, and DCI sizes corresponding to 2-2 and 2-3 can be mapped (mapping) to another column. In this case, an example of the DCI budget in the SCell may be as follows:
  column 2, column 3, column 4, column 5/column 6
  column 2, column 3/column 4, column 5, column 6

TABLE 5

| | Size (Size) (provided by a BWP in the following table) | | | | | |
|---|---|---|---|---|---|---|
| DCI format | 1 (Initial downlink BWP) C-RANI and non-C-RANI | 2 (Active uplink or downlink BWP) C-RANI | 3 (Active uplink BWP) C-RANI | 4 (Active downlink BWP) C-RANI | 5 (Configurable) C-RANI | 6 (Configurable) C-RANI |
| 0_0 | CSS in any BWP | USS in any BWP | | | | |
| 0_1 | | | USS in any BWP | | | |
| 1_0 | CSS in any BWP | USS in any BWP | | | | |
| 1_1 | | | | USS in any BWP | | |
| 2_0 | | | | | Any CSS with a configured CORESET ID in any configurable BWP | |
| 2_1 | | | | | | Any CSS with a configured CORESET ID in any configurable BWP |
| 2_2 | | Any CSS with a configured CORESET ID in any configurable BWP | | | | |

TABLE 5-continued

| | Size (Size) (provided by a BWP in the following table) | | | | | |
|---|---|---|---|---|---|---|
| DCI format | 1 (Initial downlink BWP) C-RANI and non-C-RANI | 2 (Active uplink or downlink BWP) C-RANI | 3 (Active uplink BWP) C-RANI | 4 (Active downlink BWP) C-RANI | 5 (Configurable) C-RANI | 6 (Configurable) C-RANI |
| 2_3 | Any CSS with a configured CORESET ID in any configurable BWP | | | | | |

Case 2:

Cross-carrier scheduling is configured for aggregated carriers.

For a scheduling cell, that is, a cell configured with cross-carrier scheduling, a DCI size for self-scheduling may be the same as or different from a DCI size for scheduling another carrier. For example, if self-scheduling and scheduling another carrier are mapped to a same size, blind detection is reduced. For another example, each scheduling may correspond to a different size. That is, a DCI format of another size may be configured in the scheduling cell. Therefore, a number of times of blind detection is greater than that in the single-carrier case.

A scheduled cell does not need to monitor a PDCCH on a carrier of the scheduled cell.

Therefore, when the DCI budget is considered in the carrier aggregation scenario, it is assumed that a number of aggregated carriers is X.

For non-cross-carrier scheduling (namely, self-scheduling carrier), a DCI budget on each carrier is the same as that in the single-carrier case, and a maximum number of different DCI sizes detected by the terminal on all aggregated carriers may be less than or equal to X times that in the single-carrier scenario (when X=2, there are 2*4=8 different DCI sizes, and a number of sizes DCI scrambled by using a C-RNTI cannot exceed 3*2=6). A DCI size selected for the SCell is different from that for the PCell.

For cross-carrier scheduling, a maximum number of different DCI sizes detected by the terminal on a carrier in aggregation of a plurality of carriers may be equal to a total number in the single-carrier scenario. Alternatively, a maximum number of different DCI sizes detected by the terminal on a carrier in aggregation of a plurality of carriers may be less than or equal to X times that in the single-carrier scenario. A maximum number of different DCI sizes detected by the terminal on the scheduling carrier may be less than or equal to M times that in the single-carrier scenario, where M is a configured number of scheduled carriers. The terminal may not detect DCI on a scheduled carrier (Scheduled cell).

The foregoing describes, with reference to FIG. 6 to FIG. 13, how to determine the maximum number of PDCCH candidates and the maximum number of non-overlapped CCEs during aggregation of a plurality of carriers, and analyzes the number of PDCCH candidates in terms of the DCI format with reference to Table 4 and Table 5.

The following description is related to a manner of generating a dynamic codebook of downlink data, and is applicable to a parameter determining method in another embodiment of this application. Before this embodiment of this application is described, the manner of generating a dynamic codebook of downlink data is first described.

In NR Rel-15, hybrid automatic repeat request (Hybrid Automatic Repeat reQuest, HARQ) feedback information of a PDSCH and a downlink semi-persistent scheduling (SPS) release message is generated in two manners: a static manner and a dynamic manner. Herein, HARQ-acknowledgement (ACK) is used to represent the HARQ feedback information. The dynamic codebook generation manner is implemented by using an accumulative number (counter DAI, C-DAI) and/or a total number (total DAI, T-DAI) included in DCI. The C-DAI is included in DCI format 1_0 or DCI format 1_1, and indicates an accumulative number of {serving cell, PDCCH monitoring occasion}-pairs in which a PDSCH scheduled by using DCI format 1_0 or DCI format 1_1 or a downlink SPS PDSCH release indicated by DCI format 1_0 is present up to a current serving cell and a current PDCCH monitoring occasion. Accumulation is performed first in an order of a serving cell index and then in an order of a PDCCH monitoring occasion index. The T-DAI is included in the DCI format 1_1, and indicates an accumulative number of {serving cell, PDCCH monitoring occasion}-pairs in which a PDSCH scheduled by using DCI format 1_0 or DCI format 1_1 or a downlink SPS PDSCH release indicated by DCI format 1_0 is present up to a current PDCCH monitoring occasion. The total number can be updated on each PDCCH monitoring occasion.

Specifically, FIG. 14 shows a manner of calculating a dynamic codebook. As shown in FIG. 14, a dynamic HARQ codebook is generated based on the accumulative number and the total number of {serving cell, PDCCH monitoring occasion}-pairs. Counting is performed by using a start time of the PDCCH monitoring occasion as a reference, and is performed first in an order of a serving cell sequence number and then in an order of a PDCCH monitoring occasion.

Figure 15:
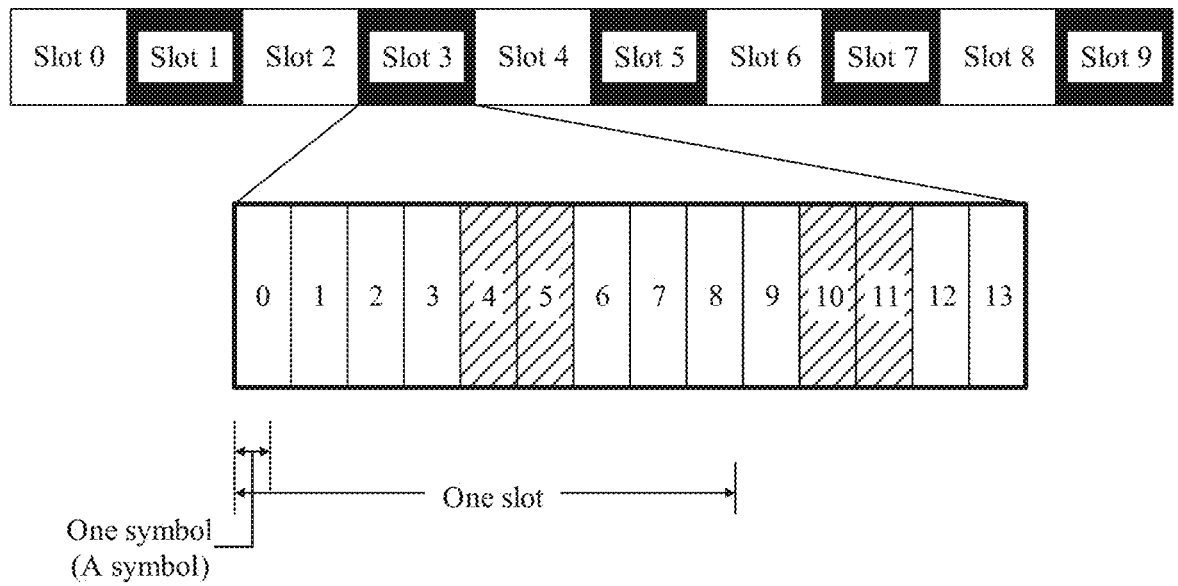
FIG. 15 is a schematic diagram of a PDCCH monitoring occasion according to an embodiment of this application.

The PDCCH monitoring occasion is a time unit used to monitor a PDCCH, and related parameters are provided in configurations of a search space and a control-resource set (CORESET). The PDCCH monitoring occasion is determined based on three parameters configured through RRC: a PDCCH monitoring periodicity, a PDCCH monitoring offset, and a PDCCH monitoring mode. As shown in FIG. 15, the PDCCH monitoring periodicity is two slots, an offset value is 1, and slots in which monitoring needs to be performed correspond to slot positions in black in the figure. Further, the PDCCH monitoring mode is used to indicate a position of a PDCCH monitoring occasion in a slot. In the PDCCH monitoring mode, a 14-bit bitmap is used to indicate a position of a symbol that needs to be monitored. In the figure, a 14-bit indication is a binary number (00001100001100), and each bit represents a position of one symbol, where 1 indicates that monitoring is required, and 0 indicates that monitoring is not required. In this way, the fourth, fifth, tenth, and eleventh symbols in slots corresponding to black parts in the figure need to be monitored. Alternatively, the 14-bit bitmap may be used to indicate a position of first symbol of a CORESET corresponding to a PDCCH monitoring occasion in a slot. Likewise, FIG. 15 is used as an example. The 14-bit indication in the figure is a binary number (00001100001100), indicating that there are four possible positions of the first symbol of a CORESET in one slot. A time length corresponding to the PDCCH monitoring occasion is determined by duration of a CORESET associated with a search space corresponding to the PDCCH monitoring occasion.

Figure 16:
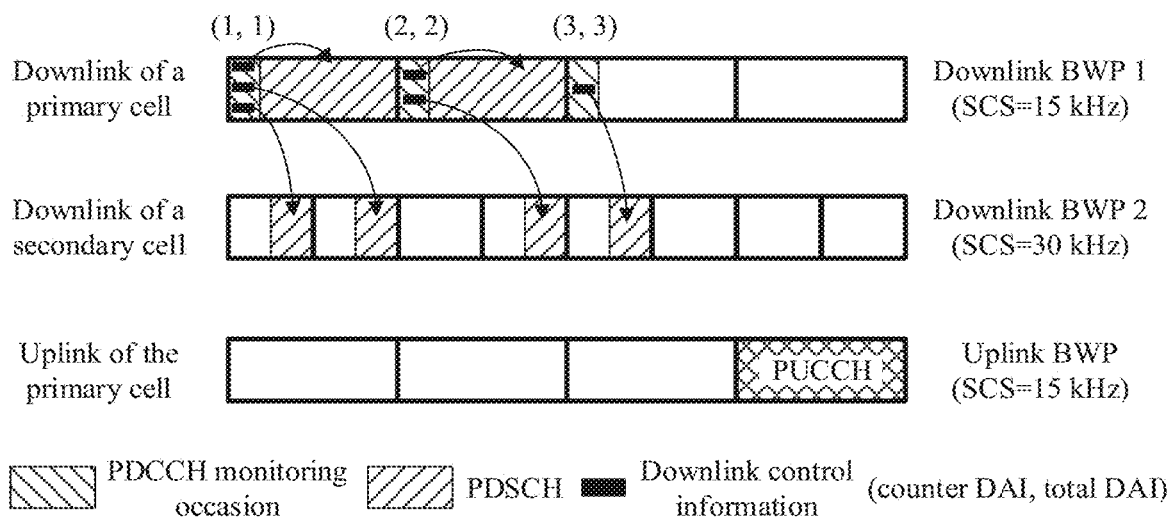
FIG. 16 is another schematic diagram of a manner of calculating a dynamic codebook.

The foregoing manner of calculating a dynamic codebook is applicable to a case in which there is only one PDCCH on one PDCCH monitoring occasion. In other words, the dynamic codebook can be calculated normally when only one piece of DCI is included. In many scenarios, one PDCCH monitoring occasion may include a plurality of pieces of DCI. As shown in FIG. 16, during cross-carrier scheduling, one PDCCH occasion includes a plurality of pieces of DCI. Alternatively, during cross-slot scheduling, one PDCCH monitoring occasion may include a plurality of pieces of DCI.

As shown in FIG. 16, when one PDCCH monitoring occasion includes a plurality of pieces of DCI, if counting is still performed based on the PDCCH monitoring occasion, information that needs to be fed back, such as hybrid automatic repeat request (Hybrid Automatic Repeat reQuest, HARQ) information, such as HARQ-ACK information, is missed. In the figure, a total of six pieces of PDSCH data are scheduled. However, because only three PDCCH monitoring occasions are available, HARQ-ACK information of only three PDSCHs can be fed back. Consequently, HARQ-ACK information of the remaining three PDSCHs is not missed. In the figure, two numbers in the brackets respectively represent values of the C-DAI and the T-DAI, that is, (C-DAI, T-DAI).

Based on this, an embodiment of this application provides a parameter determining method, to avoid missing HARQ-ACK information that needs to be fed back. The method includes: determining, by a network device, a counter downlink assignment indicator C-DAI and/or a total downlink assignment indicator T-DAI based on a serving cell of a terminal, a physical downlink control channel PDCCH monitoring occasion, and a parameter associated with the PDCCH monitoring occasion; and sending, by the network device, downlink control information DCI including the C-DAI and/or the T-DAI to the terminal.

Optionally, the parameter associated with the PDCCH monitoring occasion includes one or more of the following:

a start control channel element CCE index corresponding to a PDCCH in the PDCCH monitoring occasion;

position information of data scheduled by using the PDCCH in the PDCCH monitoring occasion; and a sequence number (ID value) of a control resource set CORESET associated with a search space associated with the PDCCH in the PDCCH monitoring occasion.

Optionally, the position information of the data scheduled by using the PDCCH includes an index of a position of the data scheduled by using the PDCCH, and an order of the position of the data scheduled by using the PDCCH is first in order of frequency domain position and then in order of time domain position. Alternatively, the order of the position of the data scheduled by using the PDCCH is first in order of time domain position and then frequency domain position.

Figure 17:
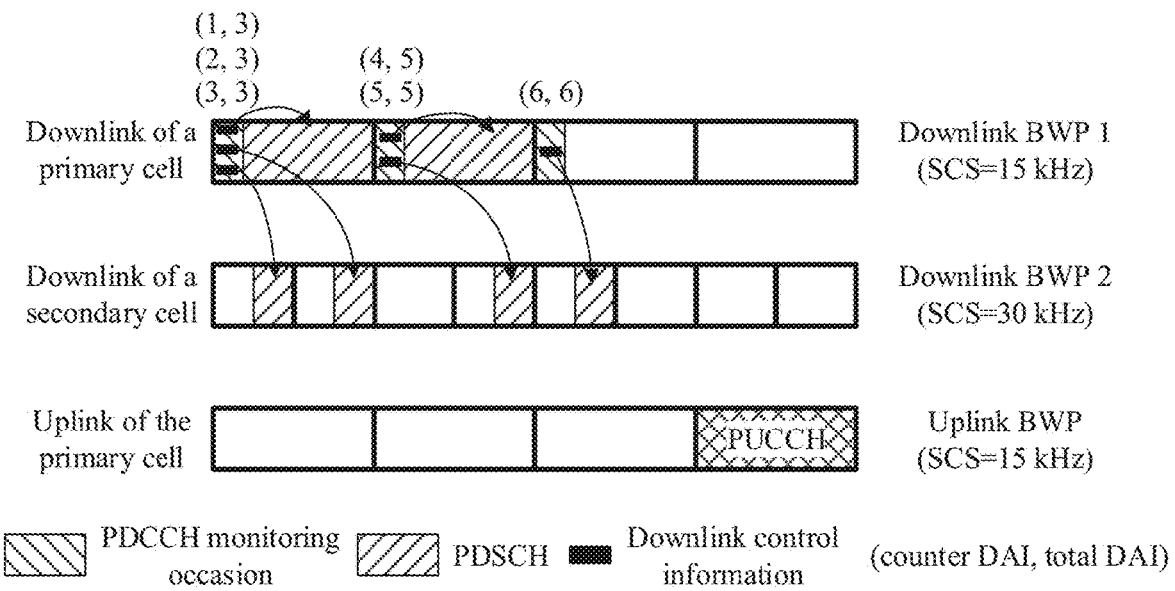
FIG. 17 is a schematic diagram of calculating a dynamic codebook according to an embodiment of this application.

Specifically, in a possible implementation, as shown in FIG. 17, the C-DAI and the T-DAI may be counted in an order of a CCE index corresponding to a PDCCH of each piece of DCI. In the figure, two numbers in the brackets respectively represent values of the C-DAI and the T-DAI, that is, (C-DAI, T-DAI). As shown in FIG. 17, on the first PDCCH monitoring occasion, three values of (C-DAI, T-DAI), which are (1,3), (2,3), and (3,3) in sequence, may be obtained in an order of CCE start addresses of three PDCCHs. A principle of counting a value of (C-DAI, T-DAI) on a subsequent PDCCH monitoring occasion is the same as that on the first PDCCH monitoring occasion, and details are not described herein again.

Figure 18:
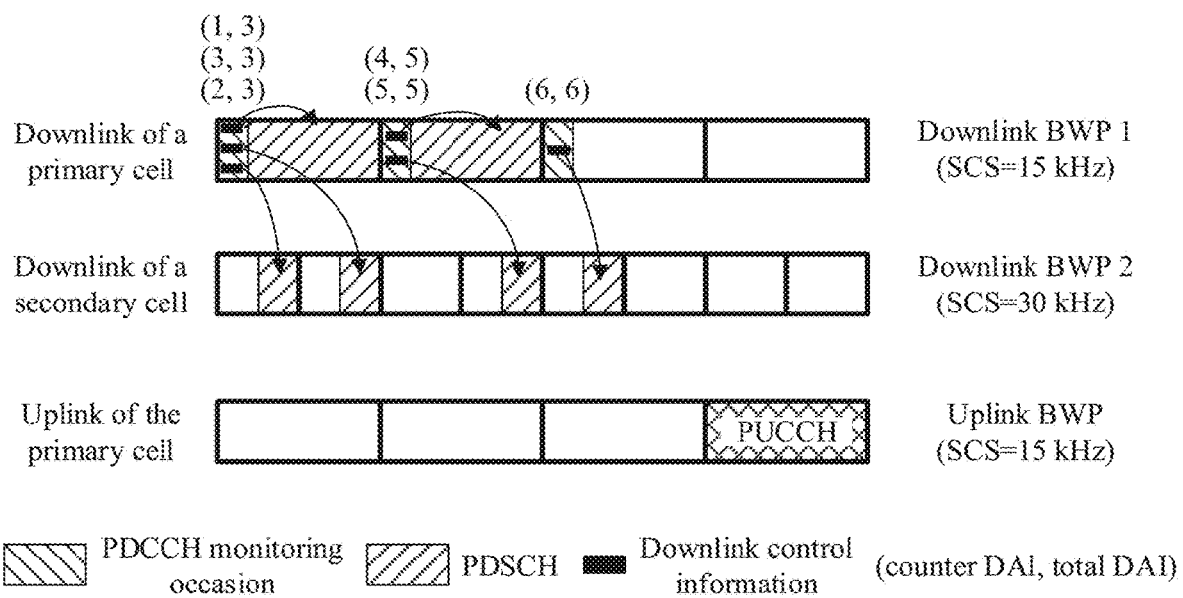
FIG. 18 is another schematic diagram of calculating a dynamic codebook according to an embodiment of this application.

In a possible implementation, as shown in FIG. 18, a position of PDSCH data scheduled by using each piece of DCI may be used for determining the C-DAI and the T-DAI. The C-DAI and the T-DAI may be counted first based on a frequency domain and then based on a time domain. As shown in FIG. 18, in a first PDCCH monitoring occasion, a C-DAI and a T-DAI are counted first in frequency domain and then in time domain based on positions of PDSCHs respectively scheduled by using three pieces of DCI, to obtain values of three pairs of (C-DAI, T-DAI), which are (1, 3), (3,3), and (2,3) in sequence. A principle of counting a value of (C-DAI, T-DAI) on a subsequent PDCCH monitoring occasion is the same as that on the first PDCCH monitoring occasion, and details are not described herein again.

In addition, for the position of the data, the C-DAI and the T-DAI may alternatively be counted first in time domain and then in frequency domain.

In a possible implementation, the C-DAI and the T-DAI may be counted by using a CORESET ID associated with a search space associated with the PDCCH monitoring occasion. For example, sorting is performed in ascending order of CORESET IDs. In a same PDCCH monitoring occasion, a sequence number (ID value) of a CORESET associated with a search space corresponding to first PDCCH is 2, and a sequence number (ID value) of a CORESET associated with a search space corresponding to the second PDCCH is 1. In this case, when a C-DAI corresponding to the first PDCCH is 2, and a C-DAI corresponding to the second PDCCH is 1, values of the two T-DAIs are both 2.

A CORESET is a time-frequency resource in a control region. A configuration of each search space or search space set is associated with a configuration of one CORESET, and the configuration of the CORESET includes a CORESET ID and duration. Unless otherwise specified, the search space described in the embodiments of this application may alternatively indicate a search space set (, and the search space and the search space set are not distinguished between herein.

A process in which the terminal receives the downlink control information is as follows:

The network device configures one CORESET or a plurality of CORESETs for the terminal, and each CORESET has its own ID, which is denoted as CORESET_ID.

A maximum of three CORESETs are configured for each BWP, and a maximum of 12 CORESETs can be configured for four BWPs.

The network device configures, for each downlink BWP, a search space used to monitor a PDCCH, and configures one search space set at a time. Each search space set has its own ID, which is denoted as a search space set index. A maximum of 10 search space sets can be configured for each BWP. Each search space set corresponds to one CORESET, and a plurality of search space sets may correspond to a same CORESET.

The terminal monitors a group of PDCCH candidates on one or more CORESETs in an active BWP of each serving cell based on configurations of the search spaces.

Figure 19:
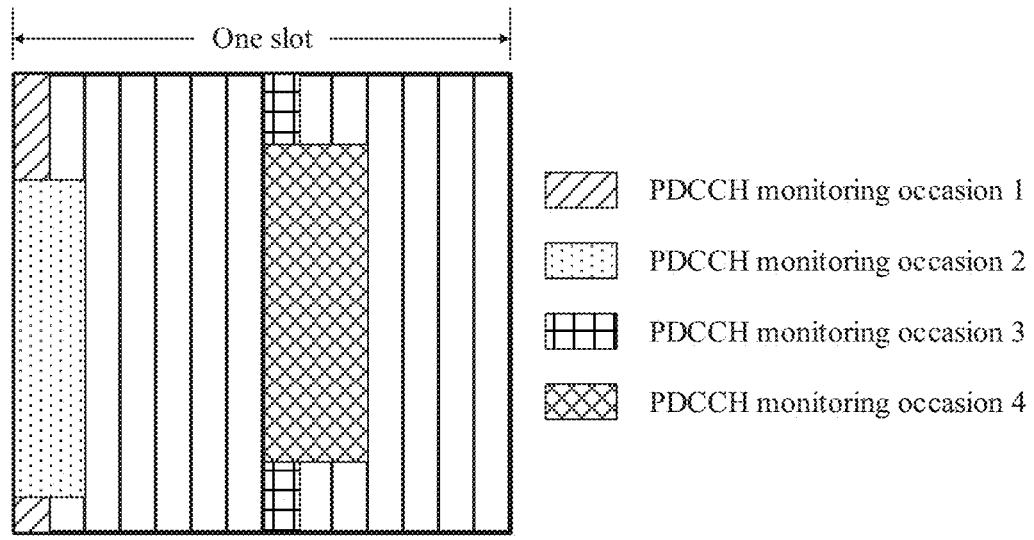
FIG. 19 is a schematic diagram of sorting a PDCCH monitoring occasion according to an embodiment of this application.

In addition, in descriptions of an existing protocol, sorting of PDCCH monitoring occasions only indicates that the sorting is performed according to start times of search spaces associated with the PDCCH monitoring occasions. When different PDCCH monitoring occasions have a same start time, the sorting cannot be performed based only on the start time. As shown in FIG. 19, a PDCCH monitoring occasion 1 and a PDCCH monitoring occasion 2 have a same start time, and a PDCCH monitoring occasion 3 and a PDCCH monitoring occasion 4 have a same start time. Therefore, a problem of sorting different PDCCH monitoring occasions associated with search spaces having a same start time needs to be resolved.

It should be noted that for simplicity, a start time of a PDCCH monitoring occasion and a start time of a search space associated with the PDCCH monitoring occasion monitoring occasion in this specification have a same meaning, and may be interchanged. Duration corresponding to a PDCCH monitoring occasion and duration of a CORESET associated with a PDCCH monitoring occasion have a same meaning, and can be interchanged.

As shown in FIG. 19, there are two groups of PDCCH monitoring occasions, where each group of PDCCH monitoring occasions have a same start time. To distinguish between the two groups of PDCCH monitoring occasions, another factor needs to be considered in addition to the start time. Based on this, an embodiment of this application provides a parameter determining method, so that PDCCH monitoring occasions having a same start time can be distinguished between, thereby clearly sorting the PDCCH monitoring occasions having the same start time, and normally counting a C-DAI and a T-DAI. The method includes: determining, by a network device, a start time of a search space associated with a physical downlink control channel PDCCH monitoring occasion and information related to the PDCCH monitoring occasion; and sorting, by the network device, the PDCCH monitoring occasion based on the start time of the search space associated with the PDCCH monitoring occasion and the information related to the PDCCH monitoring occasion.

Optionally, the information related to the PDCCH monitoring occasion includes one or more of the following:

duration corresponding to the PDCCH monitoring occasion;

an end time of the search space associated with the PDCCH monitoring occasion;

an index value of the search space associated with the PDCCH monitoring occasion; and an index value of a control resource set CORSET associated with the search space associated with the PDCCH monitoring occasion.

In this embodiment of this application, the duration may be duration of a CORESET associated with the search space corresponding to the PDCCH monitoring occasion. The end time, in a time unit, corresponding to the PDCCH monitoring occasion may be a position of an end symbol, or may be a start time plus the duration. As shown in FIG. 19, an end time of a PDCCH monitoring occasion 1 is a slot 1, and an end time of a PDCCH monitoring occasion 2 is a slot 2. In this case, the PDCCH monitoring occasion 1 is arranged before the PDCCH monitoring occasion 2 in ascending order of the end times.

Optionally, when the information related to the PDCCH monitoring occasion is duration corresponding to the PDCCH monitoring occasion, the sorting, by the network device, the PDCCH monitoring occasion based on the start time of the search space associated with the PDCCH monitoring occasion and the information related to the PDCCH monitoring occasion includes: numbering, by the network device, the PDCCH monitoring occasion according to the following formula:

$$T = A*(L-1)+S$$

where T represents a sequence number of the PDCCH monitoring occasion;

A represents a number of symbols included in each slot;

L represents the duration corresponding to the PDCCH monitoring occasion; and

S represents the start time of the search space associated with the PDCCH monitoring occasion.

Specifically, in a possible implementation, a length of consecutive symbols is also considered, and may also be referred to as duration. PDCCH monitoring occasions of different start times and different lengths may be numbered. A numbering principle is: If S represents a position of a start symbol and has a value range of (0 to 13), and L represents a length of consecutive symbols and has a value range of (1 to 3), a PDCCH monitoring occasion number is $N=14*(L-1)+S$. In this case, four PDCCH monitoring occasions in FIG. 19 are respectively numbered N1=0, N2=14, N3=7, and N4=35. Based on the numbering, PDCCH monitoring occasions with a same start time can be distinguished between and sorted.

Sorting can be performed in ascending or descending order of sequence numbers.

When a start time of a PDCCH monitoring occasion and an index value of a search space corresponding to the PDCCH monitoring occasion are used for sorting, when start times of PDCCH monitoring occasions are different, sorting is directly performed based on the start times of the PDCCH monitoring occasions. A PDCCH monitoring occasion whose start time is earlier ranks ahead. Certainly, it is also feasible that a PDCCH monitoring occasion whose start time is later ranks ahead. When start times of PDCCH monitoring occasions are the same, the PDCCH monitoring occasions are sorted based on index values of search spaces corresponding to the PDCCH monitoring occasions, and a search space with a smaller index ranks ahead of a search space with a larger index. Certainly, it is also feasible that a search space with a larger index ranks ahead of a search space with a smaller index.

Likewise, when a start time of a PDCCH monitoring occasion and an index value of a CORESET corresponding to the PDCCH monitoring occasion are used for sorting, when start times of PDCCH monitoring occasions are different, sorting is directly performed based on the start times of the PDCCH monitoring occasions. A PDCCH monitoring occasion whose start time is earlier ranks ahead. Certainly, it is also feasible that a PDCCH monitoring occasion whose start time is later ranks ahead. When start times of PDCCH monitoring occasions are the same, the PDCCH monitoring occasions are sorted based on index values of CORESETs corresponding to the PDCCH monitoring occasions, and a CORESET with a smaller index ranks ahead of a search space with a larger index. Certainly, it is also feasible that a CORESET with a larger index ranks ahead of a search space with a smaller index.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the parameter determining methods in the embodiments of this application with reference to FIG. 1 to FIG. 19. With reference to FIG. 20 to FIG. 23, the following describes in detail a communications apparatus in the embodiments of this application.

Figure 20:
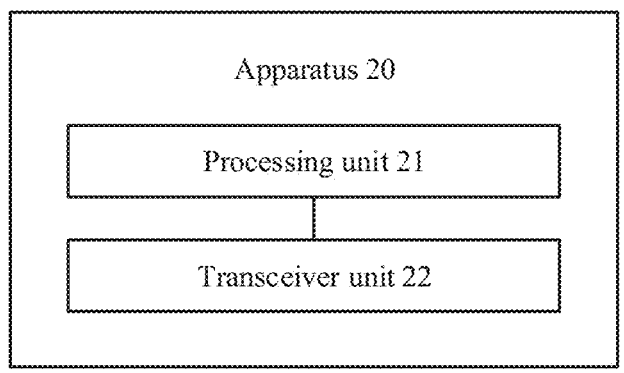
FIG. 20 is a schematic block diagram of a communications apparatus according to an embodiment of this application.

FIG. 20 is a schematic diagram of a communications apparatus 20 according to an embodiment of this application. As shown in FIG. 20, the apparatus 20 may include a processing unit 21 and a transceiver unit 22.

In a possible design, the apparatus 20 may be a network device or a chip disposed in a network device.

In a possible design, the processing unit 21 configures a plurality of serving cells for a terminal, where at least two of the plurality of serving cells have different subcarrier spacings; and determines, based on at least one of subcarrier spacings of the plurality of serving cells, a maximum number of physical downlink control channel PDCCH candidates monitored by the terminal in a unit time.

Optionally, the unit time includes first duration or predefined duration, and the first duration is a slot length corresponding to a subcarrier spacing of any one of the plurality of serving cells.

Optionally, the processing unit 21 is specifically configured to: determine, based on a number of the plurality of serving cells and a number of PDCCH candidates that corresponds to a subcarrier spacing of a first serving cell in the unit time, the maximum number of PDCCH candidates monitored by the terminal in the unit time, where the first serving cell is any one of the plurality of serving cells; or determine, based on a number of PDCCH candidates that corresponds to a subcarrier spacing of a second serving cell in the unit time and a number of PDCCH candidates that corresponds to a subcarrier spacing of a third serving cell in the unit time, the maximum number of PDCCH candidates monitored by the terminal in the unit time, where the second serving cell and the third serving cell are any two of the plurality of serving cells, and the subcarrier spacing of the second serving cell is different from the subcarrier spacing of the third serving cell; or determine, based on a number of PDCCH candidates that corresponds to a subcarrier spacing of each of the serving cells in the unit time, a maximum number of PDCCH candidates monitored by the terminal in the unit time that corresponds to each serving cell; or determine, based on a number of PDCCH candidates that corresponds to a subcarrier spacing of a fourth serving cell in the unit time, the maximum number of PDCCH candidates monitored by the terminal in the unit time, where the fourth serving cell is a predetermined reference cell.

Optionally, the unit time is the first duration. When the maximum number of PDCCH candidates monitored by the terminal in the unit time is determined based on the number of the plurality of serving cells and the number of PDCCH candidates that corresponds to the subcarrier spacing of the first serving cell in the unit time, the determined maximum number of PDCCH candidates monitored by the terminal in the unit time is a product of the number of the plurality of serving cells and the number of PDCCH candidates that corresponds to the subcarrier spacing of the first serving cell in the unit time. Alternatively, when the maximum number of PDCCH candidates monitored by the terminal in the unit time is determined based on the number of PDCCH candidates that corresponds to the subcarrier spacing of the second serving cell in the unit time and the number of PDCCH candidates that corresponds to the subcarrier spacing of the third serving cell in the unit time, the determined maximum number of PDCCH candidates monitored by the terminal in the unit time is a sum of the number of PDCCH candidates that corresponds to the subcarrier spacing of the second serving cell in the unit time and the number of PDCCH candidates that corresponds to the subcarrier spacing of the third serving cell in the unit time. Alternatively, when the maximum number of PDCCH candidates monitored by the terminal in the unit time that corresponds to each serving cell is determined based on the number of PDCCH candidates that corresponds to the subcarrier spacing of each of the serving cells in the unit time, the determined maximum number of PDCCH candidates monitored by the terminal in the unit time is a sum of the number of PDCCH candidates that corresponds to the subcarrier spacing of each of the plurality of the serving cells in the unit time.

Optionally, the unit time is the first duration, and the first duration is a slot length corresponding to the subcarrier spacing of the second serving cell.

When the maximum number, determined by the base station, of PDCCH candidates monitored by the terminal in the unit time is the sum of the number of PDCCH candidates that corresponds to the subcarrier spacing of the second serving cell in the unit time and the number of PDCCH candidates that corresponds to the subcarrier spacing of the third serving cell in the unit time, the maximum number, determined by the base station, of PDCCH candidates monitored by the terminal in the unit time is a sum of a number of PDCCH candidates that corresponds to the subcarrier spacing of the second serving cell in the first duration and a number of PDCCH candidates that corresponds to the subcarrier spacing of the third serving cell in the first duration. The number of PDCCH candidates that corresponds to the subcarrier spacing of the third serving cell in the first duration is determined based on the first duration, second duration, and a number of PDCCH candidates that corresponds to the fifth serving cell in the second duration, and the second duration is a slot length corresponding to the subcarrier spacing of the third serving cell.

Optionally, the unit time is the predefined duration. That the maximum number, determined by the network device, of PDCCH candidates monitored by the terminal in the unit time is a sum of the number of PDCCH candidates that corresponds to the subcarrier spacing of each of the plurality of the serving cells in the unit time includes: the maximum number of PDCCH candidates monitored by the terminal in the unit time is a sum of a number of PDCCH candidates that corresponds to each of the plurality of the serving cells in duration corresponding to each serving cell; or the maximum number of physical downlink control channel PDCCH candidates monitored by the terminal in the unit time is a sum of a number of PDCCH candidates that corresponds to each of the plurality of the serving cells in the predefined duration, where the number of PDCCH candidates that corresponds to each of the plurality of the serving cells in the predefined duration is determined based on the duration corresponding to each of the plurality of the serving cells, the predefined duration, and the number of PDCCH candidates that corresponds to each of the plurality of the serving cells in duration corresponding to each serving cell.

Optionally, the transceiver unit 22 is configured to receive first information reported by the terminal, where the first information is used to indicate a first parameter related to a maximum number of PDCCH candidates that can be supported by the terminal. The processing unit 21 is configured to determine, based on the first parameter and the at least one of the subcarrier spacings of the plurality of serving cells, the maximum number of PDCCH candidates monitored by the terminal in the unit time.

Optionally, the transceiver unit 22 is configured to receive second information reported by the terminal, where the second information is used to indicate N parameters, the N parameters are parameters related to a maximum number of PDCCH candidates that can be supported by the terminal, and N is less than or equal to a number of the plurality of serving cells. The processing unit 21 is configured to determine, based on the N parameters and the at least one of the plurality of subcarrier spacings of the plurality of serving cells, the maximum number of PDCCH candidates monitored by the terminal in the unit time.

Optionally, the maximum number of PDCCH candidates includes a number of PDCCH candidates that corresponds to formats of downlink control information DCI in different sizes; and: a total number of the formats of the DCI of the different sizes is less than or equal to M times a number that is of formats of DCI in different sizes and that corresponds to any one of the plurality of serving cells, where M is the number of the plurality of serving cells; and/or a number that is of formats of DCI in different sizes and that corresponds to a fourth serving cell is less than or equal to K times a number that is of formats of DCI in different sizes and that corresponds to one serving cell, where the fourth serving cell is a cell that performs cross-carrier scheduling and that is in the plurality of serving cells, and K is a number of serving cells for which the fourth serving cell performs the cross-carrier scheduling.

Functions and actions of the modules or units in the apparatus 20 listed above are merely examples for description. The modules or units in the apparatus 20 may be configured to perform actions or processing processes performed by the network device in the foregoing methods. To avoid repetition, detailed descriptions thereof are omitted herein.

In a possible design, the processing unit 21 may be configured to: determine a counter downlink assignment indicator C-DAI and/or a total downlink assignment indicator T-DAI based on a serving cell of a terminal, a physical downlink control channel PDCCH monitoring occasion, and a parameter associated with the PDCCH monitoring occasion; and send downlink control information DCI that includes the C-DAI and/or the T-DAI to the terminal.

Optionally, the parameter associated with the PDCCH monitoring occasion includes one or more of the following:

a start control channel element CCE index corresponding to a PDCCH in the PDCCH monitoring occasion;

position information of data scheduled by using the PDCCH in the PDCCH monitoring occasion; and a sequence number (ID value) of a control resource set CORESET associated with a search space associated with the PDCCH in the PDCCH monitoring occasion.

Optionally, the position information of the data scheduled by using the PDCCH includes an index of a position of the data scheduled by using the PDCCH, and an order of the position of the data scheduled by using the PDCCH is first in order of frequency domain position and then in order of time domain position.

Functions and actions of the modules or units in the apparatus 20 listed above are merely examples for description. The modules or units in the apparatus 20 may be configured to perform actions or processing processes performed by the network device in FIG. 14 to FIG. 18. To avoid repetition, detailed descriptions thereof are omitted herein.

In a possible design, the processing unit 21 may be configured to: determine a start time of a search space associated with a physical downlink control channel PDCCH monitoring occasion and information related to the PDCCH monitoring occasion; and sort the PDCCH monitoring occasion based on the start time of the search space associated with the PDCCH monitoring occasion and the information related to the PDCCH monitoring occasion.

Optionally, the information related to the PDCCH monitoring occasion includes one or more of the following:

duration corresponding to the PDCCH monitoring occasion;

an end time of the search space associated with the PDCCH monitoring occasion;

an index value of the search space associated with the PDCCH monitoring occasion; and an index value of a control resource set CORSET associated with the search space associated with the PDCCH monitoring occasion.

Optionally, when the information related to the PDCCH monitoring occasion is duration corresponding to the PDCCH monitoring occasion, the sorting the PDCCH monitoring occasion based on the start time of the search space associated with the PDCCH monitoring occasion and the information related to the PDCCH monitoring occasion includes:

The processing unit 21 is configured to number the PDCCH monitoring occasion according to the following formula:

$$T=A*(L-1)+S$$

where T represents a sequence number of the PDCCH monitoring occasion;

A represents a number of symbols included in each slot;

L represents the duration corresponding to the PDCCH monitoring occasion; and

S represents the start time of the duration corresponding to the PDCCH monitoring occasion.

Functions and actions of the modules or units in the apparatus 20 listed above are merely examples for description. The modules or units in the apparatus 20 may be configured to perform actions or processing processes performed by the network device in FIG. 19. To avoid repetition, detailed descriptions thereof are omitted herein.

For concepts, explanations, detailed descriptions, and other steps of the apparatus 20 that are related to the technical solutions provided in the embodiments of this application, refer to the descriptions of the content in the foregoing methods or other embodiments. Details are not described herein again.

Figure 21:
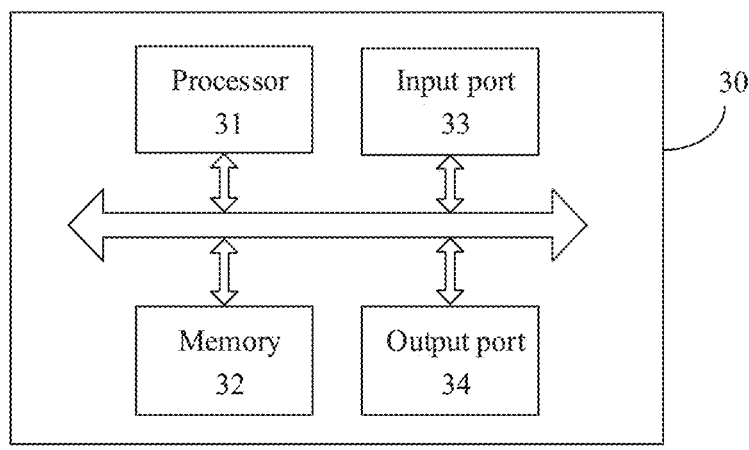
FIG. 21 is a schematic structural diagram of a communications apparatus according to an embodiment of this application.

FIG. 21 is a schematic diagram of a communications apparatus 30 according to an embodiment of this application. As shown in FIG. 21, the apparatus 30 may be a network device (for example, the foregoing network device), or may be a chip or a circuit, for example, a chip or a circuit that may be disposed in a network device. The network device corresponds to the network device (for example, the foregoing network device) in the foregoing methods.

The apparatus 30 may include a processor 31 (namely, an example of a processing unit) and a memory 32. The memory 32 is configured to store an instruction, and the processor 31 is configured to execute the instruction stored in the memory 32, so that the apparatus 30 implements the steps performed by the network device (for example, the network device) in the foregoing methods.

Further, the apparatus 30 may further include an input port 33 (namely, an example of a communications unit) and an output port 34 (namely, another example of the processing unit).

Further, the processor 31, the memory 32, the input port 33, and the output port 34 may communicate with each other through an internal connection route, to transmit a control signal and/or a data signal.

In another implementation, the network device provided in this embodiment of this application may be implemented by using a general-purpose computer. To be specific, program code that is used to implement functions of the processor 31, the input port 33, and the output port 34 is stored in the memory. A general-purpose computer implements the functions of the processor 31, the input port 33, and the output port 34 by executing the code in the memory.

The memory 32 is configured to store a computer program.

In a possible design, in this embodiment of this application, the processor 31 may be configured to invoke the computer program from the memory 32 and run the computer program to: configure a plurality of serving cells for a terminal, where at least two of the plurality of serving cells have different subcarrier spacings; and determine, based on at least one of subcarrier spacings of the plurality of serving cells, a maximum number of physical downlink control channel PDCCH candidates monitored by the terminal in a unit time.

Optionally, the unit time includes first duration or predefined duration, and the first duration is a slot length corresponding to a subcarrier spacing of any one of the plurality of serving cells.

Optionally, the processor 31 is specifically configured to: determine, based on a number of the plurality of serving cells and a number of PDCCH candidates that corresponds to a subcarrier spacing of a first serving cell in the unit time, the maximum number of PDCCH candidates monitored by the terminal in the unit time, where the first serving cell is any one of the plurality of serving cells; or determine, based on a number of PDCCH candidates that corresponds to a subcarrier spacing of a second serving cell in the unit time and a number of PDCCH candidates that corresponds to a subcarrier spacing of a third serving cell in the unit time, the maximum number of PDCCH candidates monitored by the terminal in the unit time, where the second serving cell and the third serving cell are any two of the plurality of serving cells, and the subcarrier spacing of the second serving cell is different from the subcarrier spacing of the third serving cell; or determine, based on a number of PDCCH candidates that corresponds to a subcarrier spacing of each of the serving cells in the unit time, a maximum number of PDCCH candidates monitored by the terminal in the unit time that corresponds to each serving cell; or determine, based on a number of PDCCH candidates that corresponds to a subcarrier spacing of a fourth serving cell in the unit time, the maximum number of PDCCH candidates monitored by the terminal in the unit time, where the fourth serving cell is a predetermined reference cell.

Optionally, the unit time is the first duration. When the maximum number of PDCCH candidates monitored by the terminal in the unit time is determined based on the number of the plurality of serving cells and the number of PDCCH candidates that corresponds to the subcarrier spacing of the first serving cell in the unit time, the determined maximum number of PDCCH candidates monitored by the terminal in the unit time is a product of the number of the plurality of serving cells and the number of PDCCH candidates that corresponds to the subcarrier spacing of the first serving cell in the unit time. Alternatively, when the maximum number of PDCCH candidates monitored by the terminal in the unit time is determined based on the number of PDCCH candidates that corresponds to the subcarrier spacing of the second serving cell in the unit time and the number of PDCCH candidates that corresponds to the subcarrier spacing of the third serving cell in the unit time, the determined maximum number of PDCCH candidates monitored by the terminal in the unit time is a sum of the number of PDCCH candidates that corresponds to the subcarrier spacing of the second serving cell in the unit time and the number of PDCCH candidates that corresponds to the subcarrier spacing of the third serving cell in the unit time. Alternatively, when the maximum number of PDCCH candidates monitored by the terminal in the unit time that corresponds to each serving cell is determined based on the number of PDCCH candidates that corresponds to the subcarrier spacing of each of the serving cells in the unit time, the determined maximum number of PDCCH candidates monitored by the terminal in the unit time is a sum of the number of PDCCH candidates that corresponds to the subcarrier spacing of each of the plurality of the serving cells in the unit time.

Optionally, the unit time is the predefined duration. That the maximum number, determined by the network device, of PDCCH candidates monitored by the terminal in the unit time is a sum of the number of PDCCH candidates that corresponds to the subcarrier spacing of each of the plurality of the serving cells in the unit time includes: the maximum number of PDCCH candidates monitored by the terminal in the unit time is a sum of a number of PDCCH candidates that corresponds to each of the plurality of the serving cells in duration corresponding to each serving cell; or the maximum number of physical downlink control channel PDCCH candidates monitored by the terminal in the unit time is a sum of a number of PDCCH candidates that corresponds to each of the plurality of the serving cells in the predefined duration, where the number of PDCCH candidates that corresponds to each of the plurality of the serving cells in the predefined duration is determined based on the duration corresponding to each of the plurality of the serving cells, the predefined duration, and the number of PDCCH candidates that corresponds to each of the plurality of the serving cells in duration corresponding to each serving cell.

Optionally, the input port 33 is configured to receive first information reported by the terminal, where the first information is used to indicate a first parameter related to a maximum number of PDCCH candidates that can be supported by the terminal. The processor 31 is configured to determine, based on the first parameter and the at least one of the plurality of subcarrier spacings of the plurality of serving cells, the maximum number of PDCCH candidates monitored by the terminal in the unit time.

Optionally, the input port 30 is configured to receive second information reported by the terminal, where the second information is used to indicate N parameters, the N parameters are parameters related to a maximum number of PDCCH candidates that can be supported by the terminal, and N is less than or equal to a number of the plurality of serving cells. The processor 31 is configured to determine, based on the N parameters and the at least one of the plurality of subcarrier spacings of the plurality of serving cells, the maximum number of PDCCH candidates monitored by the terminal in the unit time.

Optionally, the maximum number of PDCCH candidates includes a number of PDCCH candidates that corresponds to formats of downlink control information DCI in different sizes; and: a total number of the formats of the DCI of the different sizes is less than or equal to M times a number that is of formats of DCI in different sizes and that corresponds to any one of the plurality of serving cells, where M is the number of the plurality of serving cells; and/or a number that is of formats of DCI in different sizes and that corresponds to a fourth serving cell is less than or equal to K times a number that is of formats of DCI in different sizes and that corresponds to one serving cell, where the fourth serving cell is a cell that performs cross-carrier scheduling and that is in the plurality of serving cells, and K is a number of serving cells for which the fourth serving cell performs the cross-carrier scheduling.

Functions and actions of the modules or units in the apparatus 30 listed above are merely examples for description. The modules or units in the apparatus 30 may be configured to perform actions or processing processes performed by the network device in the foregoing methods. To avoid repetition, detailed descriptions thereof are omitted herein.

In a possible design, the processor 31 may be configured to: determine a counter downlink assignment indicator C-DAI and/or a total downlink assignment indicator T-DAI based on a serving cell of a terminal, a physical downlink control channel PDCCH monitoring occasion, and a parameter associated with the PDCCH monitoring occasion; and send downlink control information DCI that includes the C-DAI and/or the T-DAI to the terminal.

Optionally, the parameter associated with the PDCCH monitoring occasion includes one or more of the following:

a start control channel element CCE index corresponding to a PDCCH in the PDCCH monitoring occasion;

position information of data scheduled by using the PDCCH in the PDCCH monitoring occasion; and a sequence number (ID value) of a control resource set CORESET associated with a search space associated with the PDCCH in the PDCCH monitoring occasion.

Optionally, the position information of the data scheduled by using the PDCCH includes an index of a position of the data scheduled by using the PDCCH, and an order of the position of the data scheduled by using the PDCCH is first in order of frequency domain position and then in order of time domain position.

Functions and actions of the modules or units in the apparatus 30 listed above are merely examples for description. The modules or units in the apparatus 30 may be configured to perform actions or processing processes performed by the network device in FIG. 14 to FIG. 18. To avoid repetition, detailed descriptions thereof are omitted herein.

In a possible design, the processor 31 may be configured to: determine a start time of a search space associated with a physical downlink control channel PDCCH monitoring occasion and information related to the PDCCH monitoring occasion; and sort the PDCCH monitoring occasion based on the start time of the search space associated with the PDCCH monitoring occasion and the information related to the PDCCH monitoring occasion.

Optionally, the information related to the PDCCH monitoring occasion includes one or more of the following:

duration corresponding to the PDCCH monitoring occasion;

an end time of the search space associated with the PDCCH monitoring occasion;

an index value of the search space associated with the PDCCH monitoring occasion; and an index value of a control resource set CORSET associated with the search space associated with the PDCCH monitoring occasion.

Optionally, when the information related to the PDCCH monitoring occasion is duration corresponding to the PDCCH monitoring occasion, the sorting the PDCCH monitoring occasion based on the start time of the search space associated with the PDCCH monitoring occasion and the information related to the PDCCH monitoring occasion includes:

The processor 31 is configured to number the PDCCH monitoring occasion according to the following formula:

$$T=A*(L-1)+S$$

where T represents a sequence number of the PDCCH monitoring occasion;

A represents a number of symbols included in each slot;

L represents the duration corresponding to the PDCCH monitoring occasion; and

S represents the start time of the duration corresponding to the PDCCH monitoring occasion.

Functions and actions of the modules or units in the apparatus 30 listed above are merely examples for description. The modules or units in the apparatus 30 may be configured to perform actions or processing processes performed by the network device in FIG. 19. To avoid repetition, detailed descriptions thereof are omitted herein.

For concepts, explanations, detailed descriptions, and other steps of the apparatus 30 that are related to the technical solutions provided in the embodiments of this application, refer to the descriptions of the content in the foregoing methods or other embodiments. Details are not described herein again.

Figure 22:
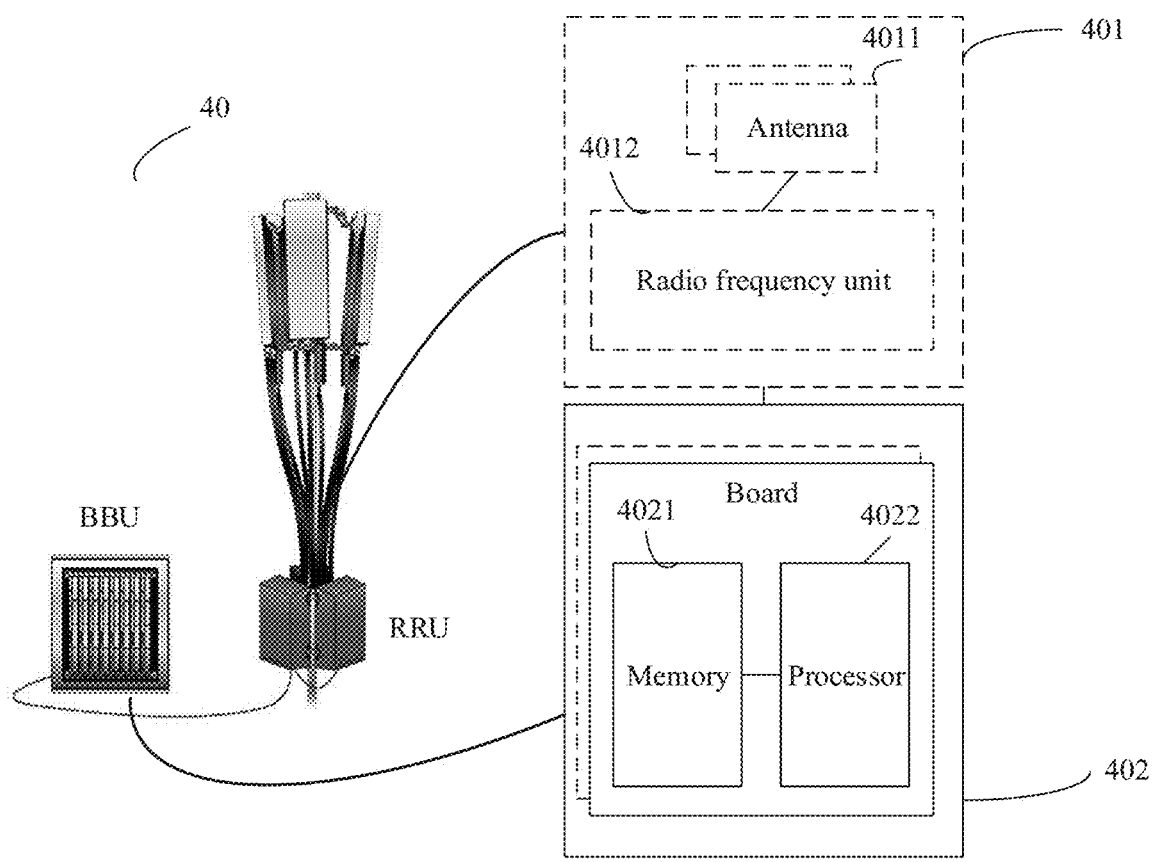
FIG. 22 is a schematic structural diagram of a network device according to an embodiment of this application.

FIG. 22 is a schematic structural diagram of a network device 40 according to an embodiment of this application. The network device may be configured to implement a function of the network device (for example, a network device) in the foregoing methods. The network device 40 includes one or more radio frequency units, such as a remote radio unit (RRU) 401 and one or more baseband units (BBU) (which may also be referred to as a digital unit, digital unit, DU) 402. The RRU 401 may be referred to as a transceiver unit, a transceiver machine, a transceiver circuit, a transceiver, or the like, and may include at least one antenna 4011 and a radio frequency unit 4012. The RRU 401 is mainly configured to: send and receive a radio frequency signal and implement conversion between a radio frequency signal and a baseband signal, for example, configured to send the signaling message in the foregoing embodiments to a terminal device. The BBU 402 is mainly configured to: perform baseband processing, control the network device, and the like. The RRU 401 and the BBU 402 may be physically disposed together, or may be physically separated, in other words, in a distributed network device.

The BBU 402 is a control center of the network device, or may be referred to as a processing unit, and is mainly configured to complete baseband processing functions such as channel coding, multiplexing, modulation, and spectrum spreading. For example, the BBU (the processing unit) 402 may be configured to control the network device 40 to execute an operation procedure related to the network device in the foregoing method embodiments.

In an example, the BBU 402 may include one or more boards, and a plurality of boards may jointly support a radio access network (such as an LTE system or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the network device to perform a necessary action, for example, is configured to control the network device to perform an operation procedure related to the network device in the foregoing method embodiments. The memory 4021 and the processor 4022 may serve the one or more boards. In other words, a memory and a processor may be disposed on each board. Alternatively, a plurality of boards may share a same memory and a same processor. In addition, a necessary circuit may further be disposed on each board.

In a possible implementation, as a system on chip (System-on-chip, SoC) technology develops, some or all of functions of the part 402 and the part 401 may be implemented by using the SoC technology, for example by using a network device chip. The network device chip is integrated with devices such as a processor, a memory, and an antenna interface, and a program of a related function of the network device is stored in the memory, and is executed by the processor to implement the related function of the network device. Optionally, the network device chip can also read a memory outside the chip to implement the related function of the network device.

It should be understood that a structure of the network device shown in FIG. 22 is merely a possible form, and should not constitute any limitation on this embodiment of this application. This application does not exclude a possibility that the network device has another form in the future.

According to the methods provided in the embodiments of this application, an embodiment of this application further provides a parameter determining system, where the parameter determining system includes the foregoing network device and one or more terminal devices.

Figure 23:
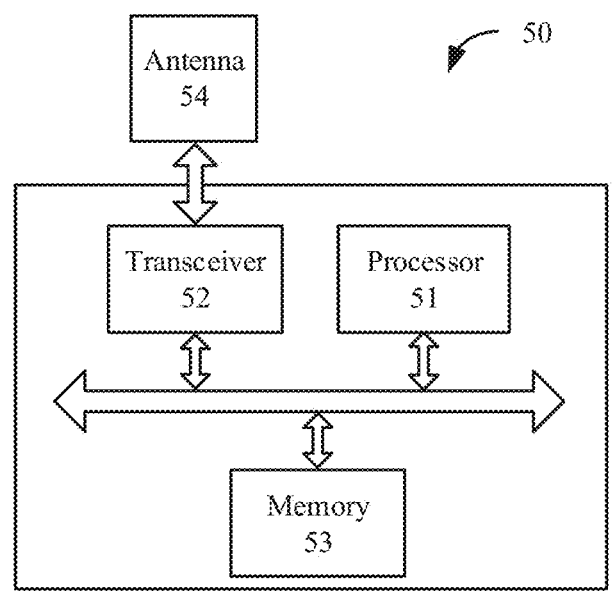
FIG. 23 is a schematic structural diagram of a terminal device according to an embodiment of this application.

FIG. 23 is a schematic structural diagram of a terminal device 50 according to an embodiment of this application. As shown in FIG. 23, the terminal device 50 includes a processor 51 and a transceiver 52. Optionally, the terminal device 50 further includes a memory 53. Through an internal connection path, the processor 51, the transceiver 52, and the memory 53 communicate with each other, and transfer a control signal and/or a data signal. The memory 53 is configured to store a computer program. The processor 51 is configured to invoke the computer program from the memory 53 and run the computer program, to control the transceiver 52 to send and receive a signal.

The processor 51 and the memory 53 may be integrated into one processing apparatus. The processor 51 is configured to execute program code stored in the memory 53 to implement the foregoing functions. During specific implementation, the memory 53 may also be integrated into the processor 51, or may be independent of the processor 51.

The terminal device may further include an antenna 54, configured to send, by using a radio signal, downlink data or downlink control signaling output by the transceiver 52.

Specifically, the terminal device 50 may correspond to the terminal device in the parameter determining methods in the embodiments of this application, and the terminal device 50 may include modules configured to perform the method performed by the terminal device in the foregoing method embodiments. Specifically, the memory 53 is configured to store the program code, so that when executing the program code, the processor 51 performs the method performed by the terminal device in the foregoing method embodiments. A specific process in which each module performs a foregoing corresponding step is described in detail. For brevity, details are not described herein again.

It should be understood that the processor in the embodiments of this application may be a central processing unit (CPU), or may be another general-purpose processor, a digital signal processor (DSP), an application-specific integrated circuit (ASIC), a field programmable gate array (FPGA) or another programmable logic device, discrete gate or transistor logic device, a discrete hardware component, or the like. The general-purpose processor may be a microprocessor, or the processor may be any conventional processor or the like.

It may be further understood that the memory in the embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

All or some of the foregoing embodiments may be implemented by software, hardware, firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on a particular application and a design constraint condition of the technical solution. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed to a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    configuring, by a network device, a plurality of serving cells for a terminal, wherein at least two of the plurality of serving cells have different subcarrier spacings; and
    determining, by the network device based on at least one of subcarrier spacings of the plurality of serving cells, a first maximum number of physical downlink control channel (PDCCH) candidates to be monitored by the terminal in a unit time for communication of the terminal with one or more of the plurality of serving cells; and
    wherein determining the first maximum number of PDCCH candidates to be monitored by the terminal in the unit time comprises determining, by the network device based on a second number of PDCCH candidates that corresponds to a subcarrier spacing of each of the plurality of serving cells in the unit time, the first maximum number of PDCCH candidates that is to be monitored by the terminal in the unit time.

2. The method according to claim 1, wherein the unit time comprises a first duration or a predefined duration, and the first duration is a slot length corresponding to a subcarrier spacing of a serving cell in the plurality of serving cells.

3. The method according to claim 1, wherein
    the first maximum number of PDCCH candidates to be monitored by the terminal in the unit time is a sum of the second number of PDCCH candidates corresponding to respective subcarrier spacings of the plurality of serving cells in the unit time.

4. The method according to claim 1, wherein the plurality of serving cells comprises a scheduling cell and a scheduled cell, the first maximum number of PDCCH candidates that is to be monitored by the terminal in the unit time and that corresponds to the scheduled cell is determined based on a subcarrier spacing of the scheduling cell.

5. A method, comprising:
    obtaining, by a terminal, a first maximum number of physical downlink control channel (PDCCH) candidates to be monitored by the terminal in a unit time for communication of the terminal with one or more of a plurality of serving cells configured for the terminal; and
    monitoring, by the terminal, a PDCCH based on the first maximum number of PDCCH candidates, wherein at least two of the plurality of serving cells have different subcarrier spacings, and the first maximum number of PDCCH candidates is determined based on at least one of subcarrier spacings of the plurality of serving cells; and wherein the first maximum number of PDCCH candidates to be monitored by the terminal in the unit time is determined based on a second maximum number of PDCCH candidates that corresponds to a subcarrier spacing of each of the plurality of serving cells in the unit time.

6. The method according to claim 5, wherein the unit time comprises a first duration or a predefined duration, and the first duration is a slot length corresponding to a subcarrier spacing of a serving cell in the plurality of serving cells.

7. The method according to claim 5, wherein
the first maximum number of PDCCH candidates to be monitored by the terminal in the unit time is a sum of the second maximum numbers of PDCCH candidates corresponding to the respective subcarrier spacings of the plurality of serving cells in the unit time.

8. The method according to claim 5, wherein the plurality of serving cells comprises a scheduling cell and a scheduled cell, the first maximum number of PDCCH candidates that is to be monitored by the terminal in the unit time and that corresponds to the scheduled cell is determined based on a subcarrier spacing of the scheduling cell.

9. A communications apparatus, comprising:
a non-transitory memory storing instructions; and
a processor coupled to the memory to execute the instructions for:
configuring a plurality of serving cells for a terminal, wherein at least two of the plurality of serving cells have different subcarrier spacings; and
determining, based on at least one of subcarrier spacings of the plurality of serving cells, a first maximum number of physical downlink control channel (PDCCH) candidates to be monitored by the terminal in a unit time for communication of the terminal with one or more the plurality of serving cells; and
wherein determining, based on the at least one of the subcarrier spacings of the plurality of serving cells, the first maximum number of PDCCH candidates to be monitored by the terminal in the unit time comprises:
determining, based on a second maximum number of PDCCH candidates that corresponds to a subcarrier spacing of each of the plurality of serving cells in the unit time, the first maximum number of PDCCH candidates that is to be monitored by the terminal in the unit time.

10. The communications apparatus according to claim 9, wherein the unit time comprises a first duration or a predefined duration, and the first duration is a slot length corresponding to a subcarrier spacing of a serving cell in the plurality of serving cells.

11. The communications apparatus according to claim 9, wherein
the first maximum number of PDCCH candidates to be monitored by the terminal in the unit time is a sum of the second maximum numbers of PDCCH candidates corresponding to the respective subcarrier spacings of the plurality of the serving cells in the unit time.

12. The communications apparatus according to claim 9, wherein the plurality of serving cells comprises a scheduling cell and a scheduled cell, the first maximum number of PDCCH candidates that is to be monitored by the terminal in the unit time and that corresponds to the scheduled cell is determined based on a subcarrier spacing of the scheduling cell.

13. A communications apparatus, comprising:
a non-transitory memory storing instructions; and
a processor coupled to the memory to execute the instructions for:
obtaining a first maximum number of physical downlink control channel (PDCCH) candidates to be monitored by the communications apparatus in a unit time for communication of the communications apparatus with one or more of a plurality of serving cells configured for the communications apparatus; and
monitoring a PDCCH based on the first maximum number of PDCCH candidates, wherein
at least two of the plurality of serving cells have different subcarrier spacings, and the first maximum number of PDCCH candidates is determined based on at least one of subcarrier spacings of the plurality of serving cells, and the first maximum number of PDCCH candidates is determined based on a second maximum number of PDCCH candidates that corresponds to a subcarrier spacing of each of the plurality of the serving cells in the unit time.

14. The communications apparatus according to claim 13, wherein the unit time comprises a first duration or a predefined duration, and the first duration is a slot length corresponding to a subcarrier spacing of a serving cell in the plurality of serving cells.

15. The communications apparatus according to claim 13, wherein
the first maximum number of PDCCH candidates to be monitored by the communications apparatus in the unit time is a sum of the second maximum numbers of PDCCH candidates corresponding to the respective subcarrier spacings of the plurality of the serving cells in the unit time.

16. The communications apparatus according to claim 13, wherein the plurality of serving cells comprises a scheduling cell and a scheduled cell, the first maximum number of PDCCH candidates that is to be monitored by the communications apparatus in the unit time and that corresponds to the scheduled cell is determined based on a subcarrier spacing of the scheduling cell.

* * * * *